(12) United States Patent
Goldfine

(10) Patent No.: US 11,559,178 B1
(45) Date of Patent: Jan. 24, 2023

(54) DEFECATION POSTURAL MODIFICATION DEVICES

(71) Applicant: Lisa Goldfine, Larchmont, NY (US)

(72) Inventor: Lisa Goldfine, Larchmont, NY (US)

(*) Notice: Subject to any disclaimer, the term of this patent is extended or adjusted under 35 U.S.C. 154(b) by 61 days.

(21) Appl. No.: 17/175,876

(22) Filed: Feb. 15, 2021

Related U.S. Application Data

(60) Provisional application No. 62/976,424, filed on Feb. 14, 2020.

(51) Int. Cl.
*A47K 17/02* (2006.01)
*A47K 11/04* (2006.01)
*A63B 22/06* (2006.01)
*G09B 19/00* (2006.01)

(52) U.S. Cl.
CPC ............ *A47K 17/028* (2013.01); *A47K 11/04* (2013.01); *A63B 22/0605* (2013.01); *A63B 2022/0635* (2013.01); *G09B 19/0076* (2013.01)

(58) Field of Classification Search
CPC ............... A47K 17/028; A47K 11/04; A63B 22/0605; A63B 2022/0635
USPC ............................................................ 4/483
See application file for complete search history.

(56) References Cited

U.S. PATENT DOCUMENTS

| 4,466,140 | A | * | 8/1984 | Sakamoto | A47K 17/028 4/254 |
| 9,526,385 | B2 | | 12/2016 | Davis | |
| 2016/0360938 | A1 | * | 12/2016 | Mulford | A47K 17/028 |
| 2018/0325337 | A1 | * | 11/2018 | Kim | A47K 17/028 |
| 2020/0253432 | A1 | * | 8/2020 | Slothower | A47K 17/028 |

OTHER PUBLICATIONS

Modi et al., "Implementation of a Defecation Posture Modification Device. Impact on Bowel Movement Patterns in Healthy Subjects." J. Clin. Gastroenterology, Mar. 2019, vol. 53, No. 3, pp. 216-219.
Sakakibara et al. "Influence of Body Position on Defecation in Humans." Lower Urinary Tract Symptoms (LUTS), 2010, No. 2, pp. 16-21.
Sikirov, "Comparison of Straining During Defecation in Three Positions." Digestive Diseases and Sciences, Jul. 2003, vol. 48, No. 7, pp. 1201-1205.

\* cited by examiner

*Primary Examiner* — Huyen D Le
(74) *Attorney, Agent, or Firm* — Van Court & Aldridge LLP

(57) ABSTRACT

A stationary children's toilet assembly may include a potty with a pedaling mechanism (e.g., one or more cycling pedals) coupled thereto that together may act as a defecation postural modification device by raising a child's legs up and increasing hip flexion during user, which may support proper squatting posture and aid elimination.

20 Claims, 17 Drawing Sheets

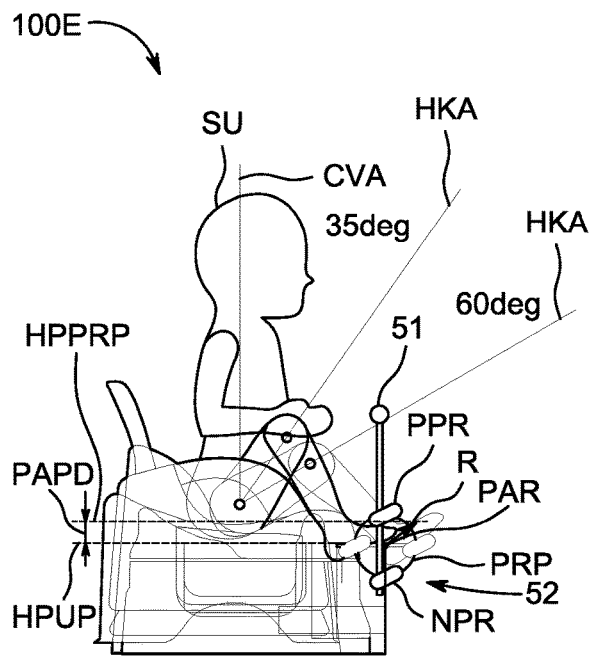 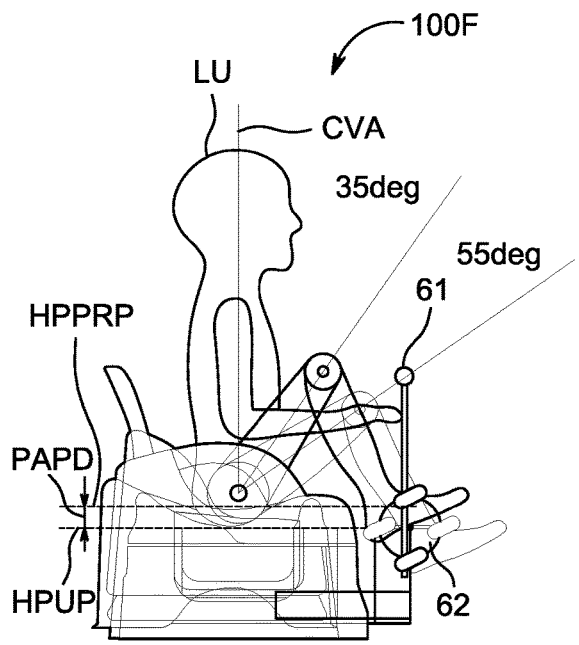
FIG. 1E
FIG. 1F
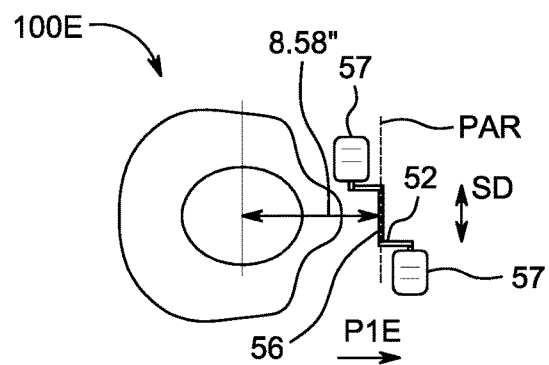 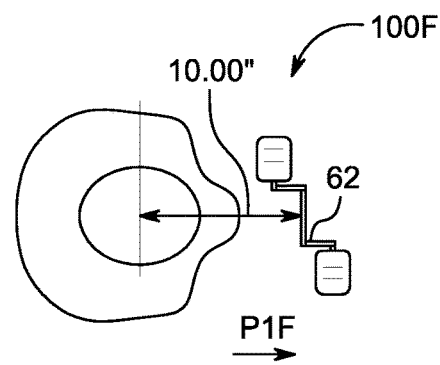
FIG. 1E'
FIG. 1F'

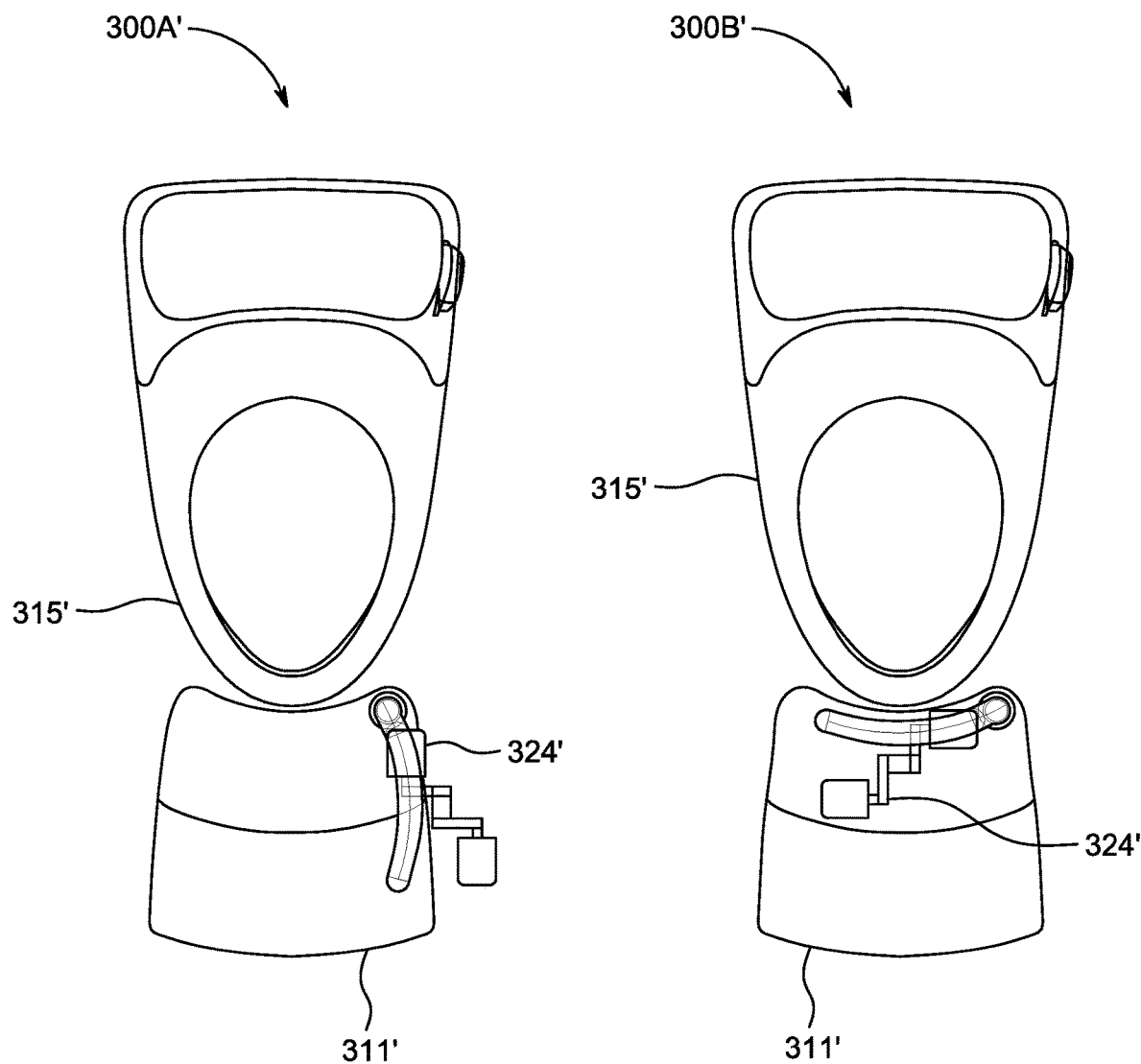

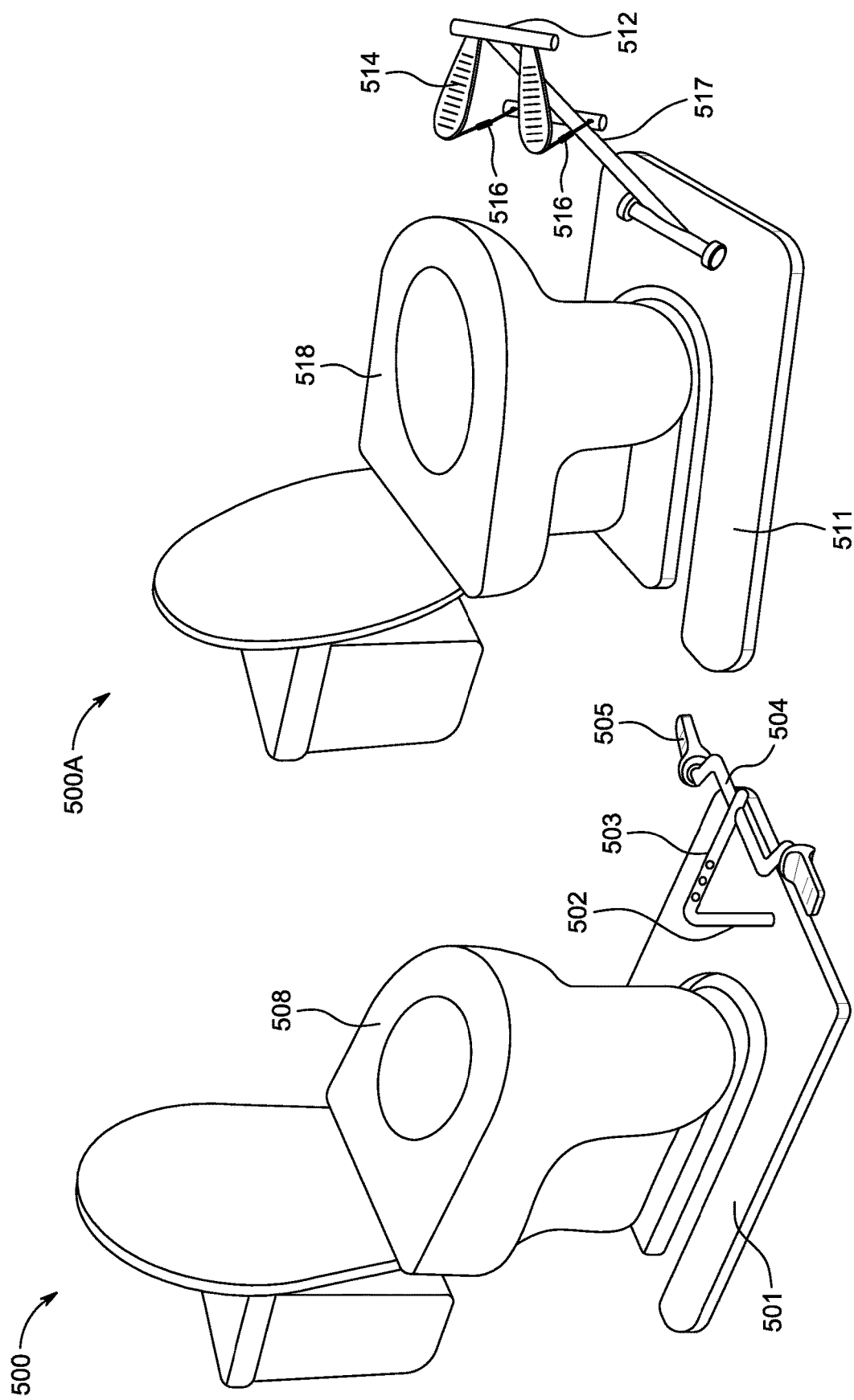

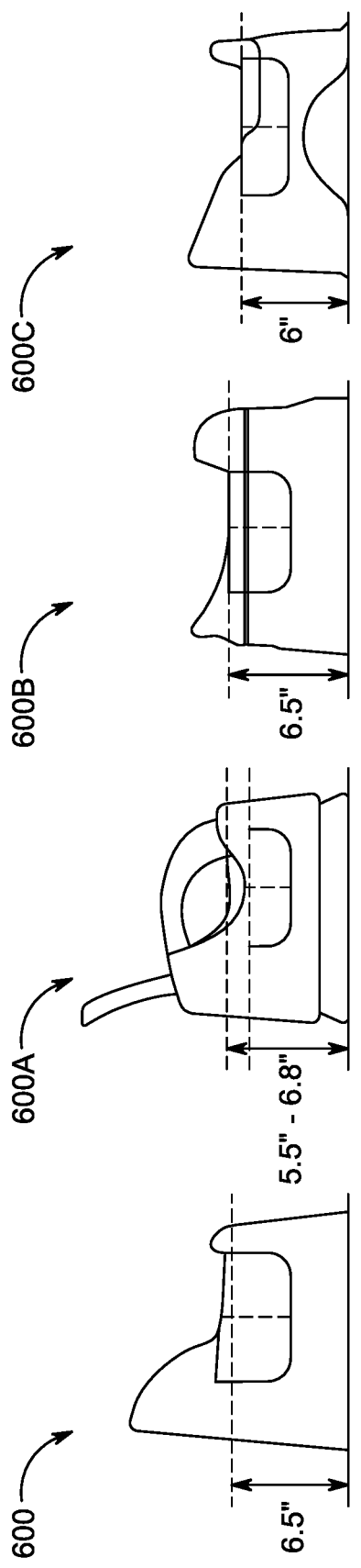
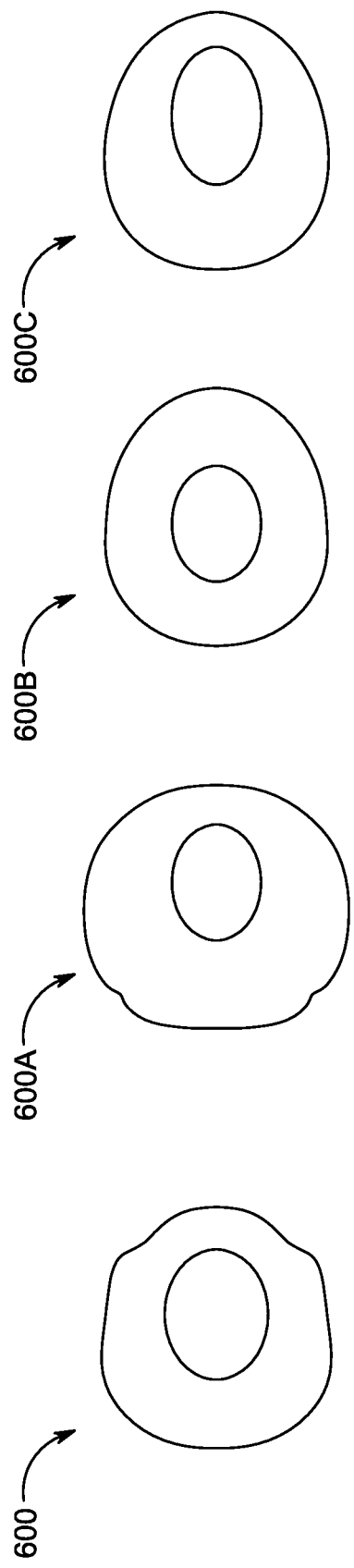

DEFECATION POSTURAL MODIFICATION DEVICES

CROSS-REFERENCE TO RELATED APPLICATION(S)

This application claims the benefit of prior filed U.S. Provisional Patent Application No. 62/976,424, filed Feb. 14, 2020, which is hereby incorporated by reference herein in its entirety.

TECHNICAL FIELD

This disclosure relates to defecation postural modification devices ("DPMDs") and, more particularly, to DPMDs and their variants that involve foot motion and positioning to help promote proper elimination for children and adults.

BACKGROUND OF THE DISCLOSURE

It is well established that constipation symptoms, as well as hemorrhoids, are common ailments that frequently plague individuals. It has further been established that defecation devices that promote a proper squatting position positively influence bowel movement duration, straining patterns, and complete evacuation of bowels. It is commonly held that the greater the hip flexion, the straighter the rectoanal canal and, accordingly, the less strain required for emptying the bowels. Individuals from non-Western cultures who customarily adopt a squatting posture when defecating have been shown typically to suffer less often from constipation-related ailments.

SUMMARY OF THE DISCLOSURE

This document describes DPMDs and methods for using the same.

For example, a DPMD assembly for use with a toilet seat operative to support a user seated thereon may include a pedaling mechanism including a pedal axle defining a pedal axis of rotation, and a pedal coupled to an end of the pedal axle and operative to be rotated along a pedaling rotation path that extends about the pedal axis of rotation, and a toilet coupling mechanism coupled to the pedaling mechanism and operative to hold the pedaling mechanism in a functional position with respect to the toilet seat, wherein the pinnacle of the pedaling rotation path is higher off the ground than the toilet seat when the pedaling mechanism is held in the functional position with respect to the toilet seat.

As another example, a DPMD assembly for use with a toilet seat operative to support a user seated thereon may include a foot mechanism including a foot axle defining a foot axis of rotation, and a pedal coupled to an end of the foot axle and operative to be rotated along at least a portion of a foot rotation path that extends about the foot axis of rotation, and a toilet coupling mechanism coupled to the pedaling mechanism and operative to hold the foot mechanism in a functional position with respect to the toilet seat, wherein at least a portion of the at least a portion of the foot rotation path is higher off the ground than the anus of the user seated on the toilet seat when the foot mechanism is held in the functional position with respect to the toilet seat.

As yet another example, a DPMD assembly may include a toilet including a toilet seat, a pedaling mechanism including a pedal axle defining a pedal axis of rotation, and a pedal coupled to an end of the pedal axle and operative to be rotated along a pedaling rotation path about the pedal axis of rotation, and a toilet coupling mechanism coupled to the toilet and coupled to the pedaling mechanism, wherein the toilet coupling mechanism is operative to hold the pedaling mechanism in a functional position with respect to the toilet seat, and wherein rotation of the pedal along the pedaling rotation path does not move the toilet along the ground when the pedaling mechanism is held in the functional position with respect to the toilet seat.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIG. 1E is a right side elevational view of yet another DPMD assembly;

FIG. 1E' is a top view of the DPMD assembly of FIG. 1E;

FIG. 1F is a right side elevational view of yet another DPMD assembly;

FIG. 1F' is a top view of the DPMD assembly of FIG. 1F;

FIG. 1I' is a top view of the DPMD assembly of FIG. 1I;

FIG. 1J' is a top view of the DPMD assembly of FIG. 1J;

FIG. 3A' is a top view of yet another DPMD assembly, similar to the DPMD assembly of FIG. 3, but in another stage of use;

FIG. 3B' is a top view of yet another DPMD assembly, similar to the DPMD assemblies of FIGS. 3 and 3A', but in another stage of use;

FIG. 5 is a front, top, right side perspective view of yet another DPMD assembly;

FIG. 5A is a front, top, right side perspective view of yet another DPMD assembly;

FIG. 6 is a right side elevational view of a potty for a DPMD assembly;

FIG. 6' is a top view of the potty of FIG. 6;

FIG. 6A is a right side elevational view of another potty for a DPMD assembly;

FIG. 6A' is a top view of the potty of FIG. 6A;

FIG. 6B is a right side elevational view of yet another potty for a DPMD assembly;

FIG. 6B' is a top view of the potty of FIG. 6B;

FIG. 6C is a right side elevational view of yet another potty for a DPMD assembly;

FIG. 6C' is a top view of the potty of FIG. 6C;

DETAILED DESCRIPTION OF THE DISCLOSURE

This disclosure describes several DPMD types, including, but not limited to, a first type that may be referred to herein as the "Original Pedal Potty Assembly," a second type that may be referred to herein as the "Pedal Potty Mat Assembly (for Kids)," a third type that may be referred to herein as the "Pedal Potty 'Step' Assembly (for Kids)," a fourth type that may be referred to herein as the "Pedal Training Seat Assembly (for Kids)," a fifth type that may be referred to herein as the "Pedal Potty 'Belt'/'Clamp' Assembly (for Adults)," a sixth type that may be referred to herein as the "Pedal Potty Mat Assembly (for Adults)," and a seventh type that may be referred to herein as the "'Stair Stepper' Assembly (for Adults)," each of which may provide a DPMD operative to support proper squatting posture, thereby aiding elimination. As just one example, the Original Pedal Potty Assembly may include a stationary children's potty with cycle (e.g., tricycle) pedals coupled thereto that may act as a DPMD by raising the child's legs up and increasing hip flexion. This potty pedaling mechanism may support proper squatting posture and aid elimination. The pedaling motion itself, which may be enabled by the pedals, may also stimulate the colon, thereby further facilitating healthy bowel movements. Moreover, such an original pedal potty may provide the child with a potty reward system whereby the child may receive positive reinforcement for using the potty as a result of the fun and motivating pedaling motion that may be reminiscent of riding a tricycle. The pedaling motion may trigger lights to turn on or some other kind of motion to occur (e.g., gears spinning, pop-up toys popping, etc.), which may further positively reinforce the child's attempts at using the potty. This kind of positive reinforcement may increase the likelihood that the child would return to use the potty on subsequent occasions, thereby helping children to establish a potty hygiene routine as well as reducing the stress involved in potty training for both parents and children.

Figure 7A:
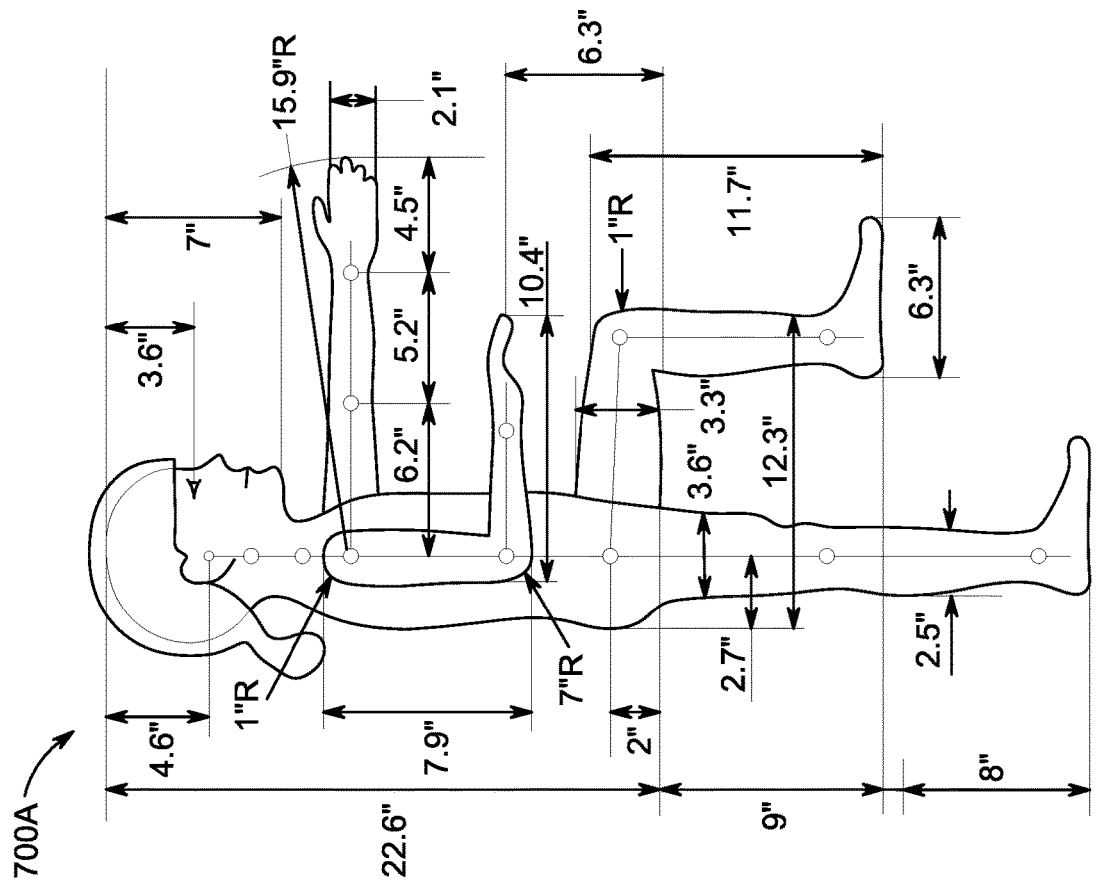
FIG. 7A is a right side elevational view of another illustrative user of a DPMD assembly.
Figure 7:
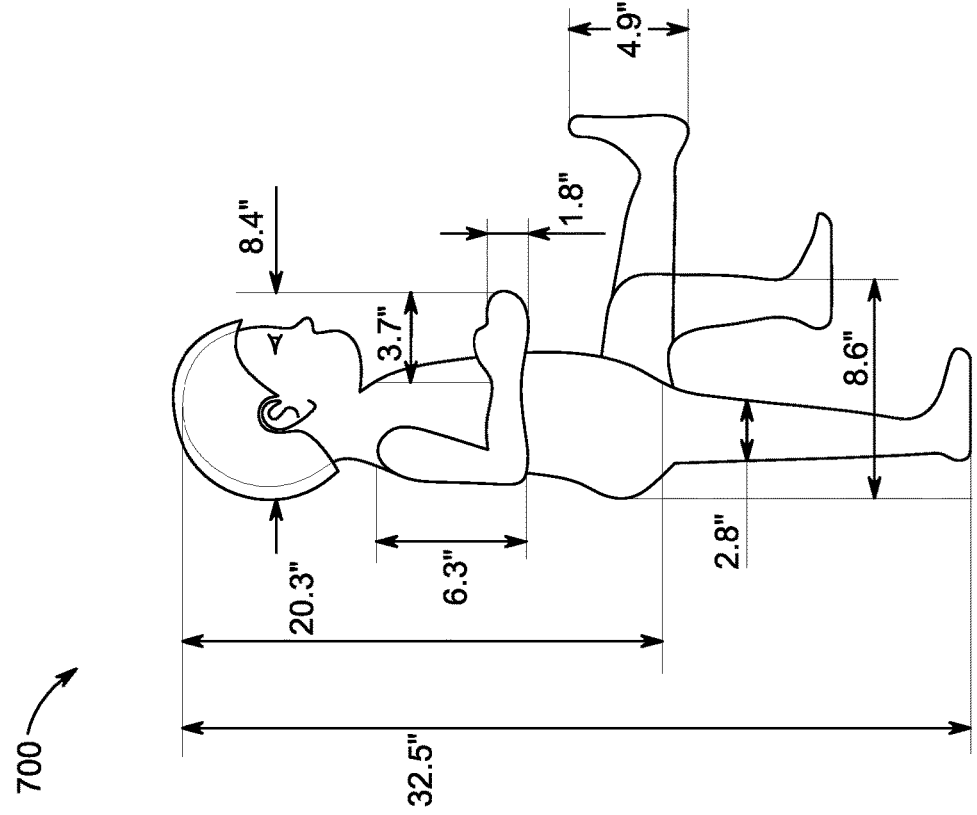
FIG. 7 is a right side elevational view of an illustrative user of a DPMD assembly.

Potties may come in various shapes and sizes, each of which may be used as a portion of any suitable pedal potty or other DPMD. For example, any one of various suitable child potties, such as shown by potty 600 of FIGS. 6 and 6', potty 600A of FIGS. 6A and 6A', potty 600B of FIGS. 6B and 6B', and potty 600C of FIGS. 6C and 6C', may be used as a portion of any suitable pedal potty that may be configured for use by any suitable child user, which itself may be any suitable age and size, such as shown by a typical 20-23 month old child 700 of FIG. 7 with certain illustrative measurements identified and a typical 4 year old child 700A of FIG. 7A with certain illustrative measurements identified. As shown, a potty seat height may vary between 5.5" and 6.8" or any other suitable range off the ground for providing a comfortable height for most children, although any other suitable seat portion height may be used. Some seats may have its bowl biased forward (e.g., to let a smaller child's feet touch the ground). Some seats may include a back rest, which may be useful for providing support to children that may slide back when pedaling.

Figure 1:
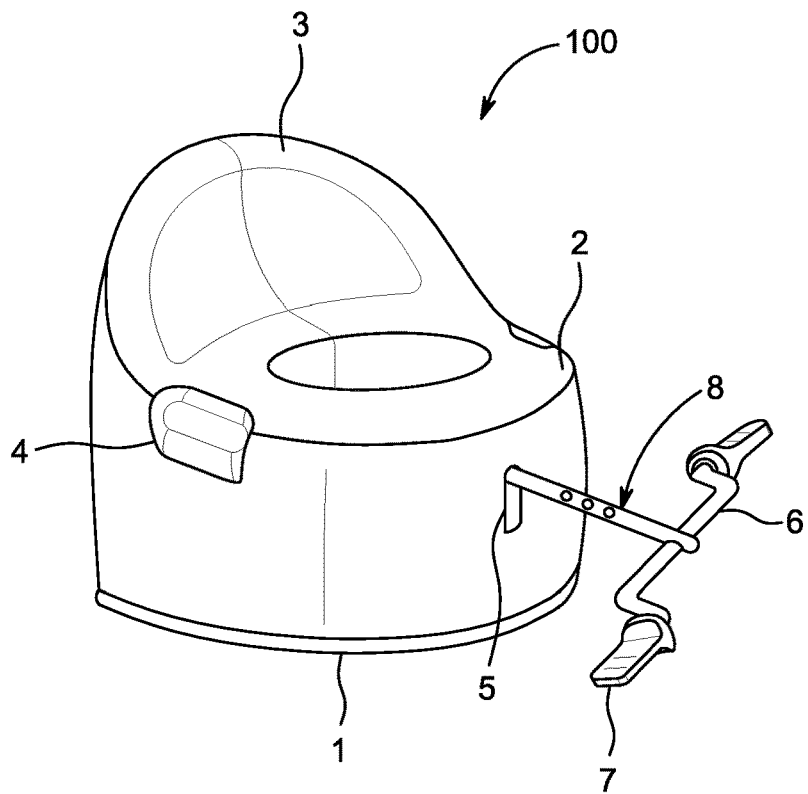
FIG. 1 is a front, top, right side perspective view of a DPMD assembly.
Figure 1A:
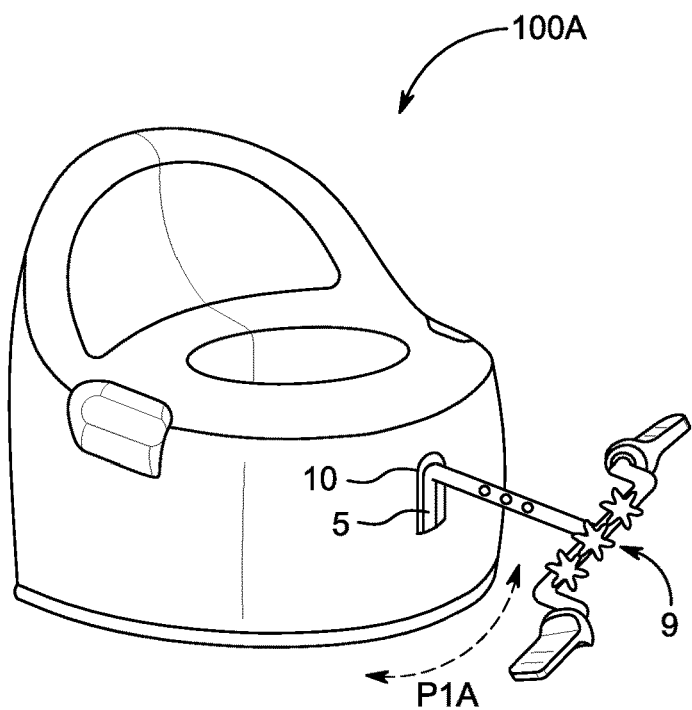
FIG. 1A is a front, top, right side perspective view of another DPMD assembly.
Figure 1B:
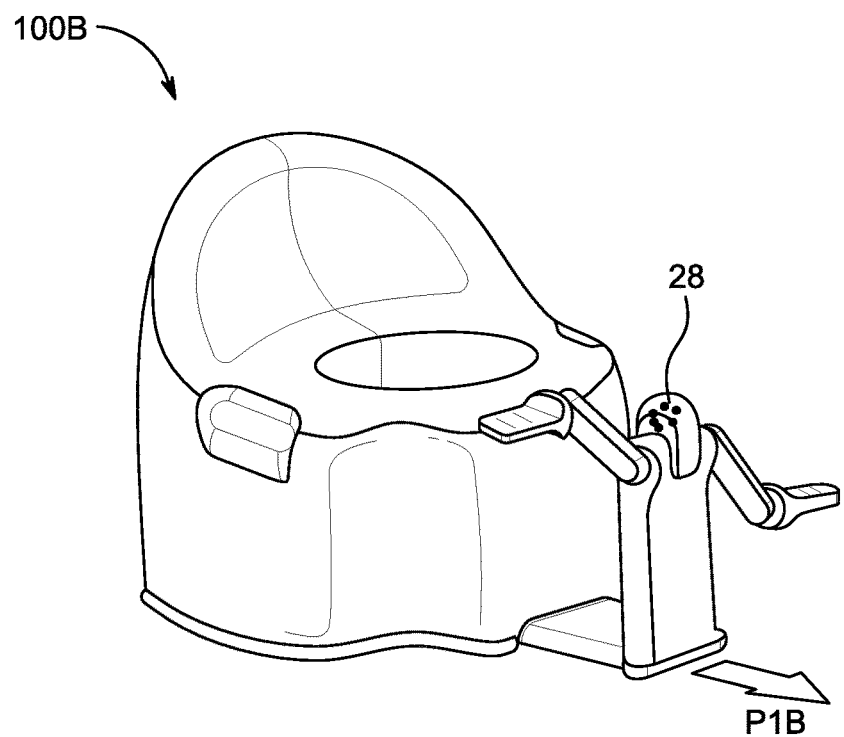
FIG. 1B is a front, top, right side perspective view of yet another DPMD assembly.
Figure 1C:
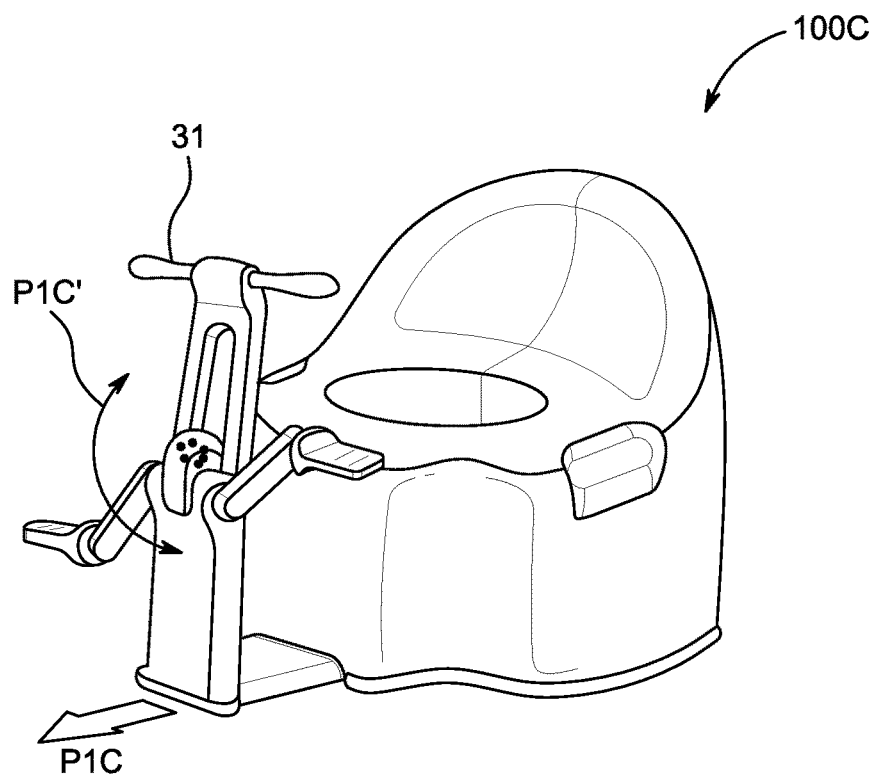
FIG. 1C is a front, top, right side perspective view of yet another DPMD assembly.
Figure 1D:
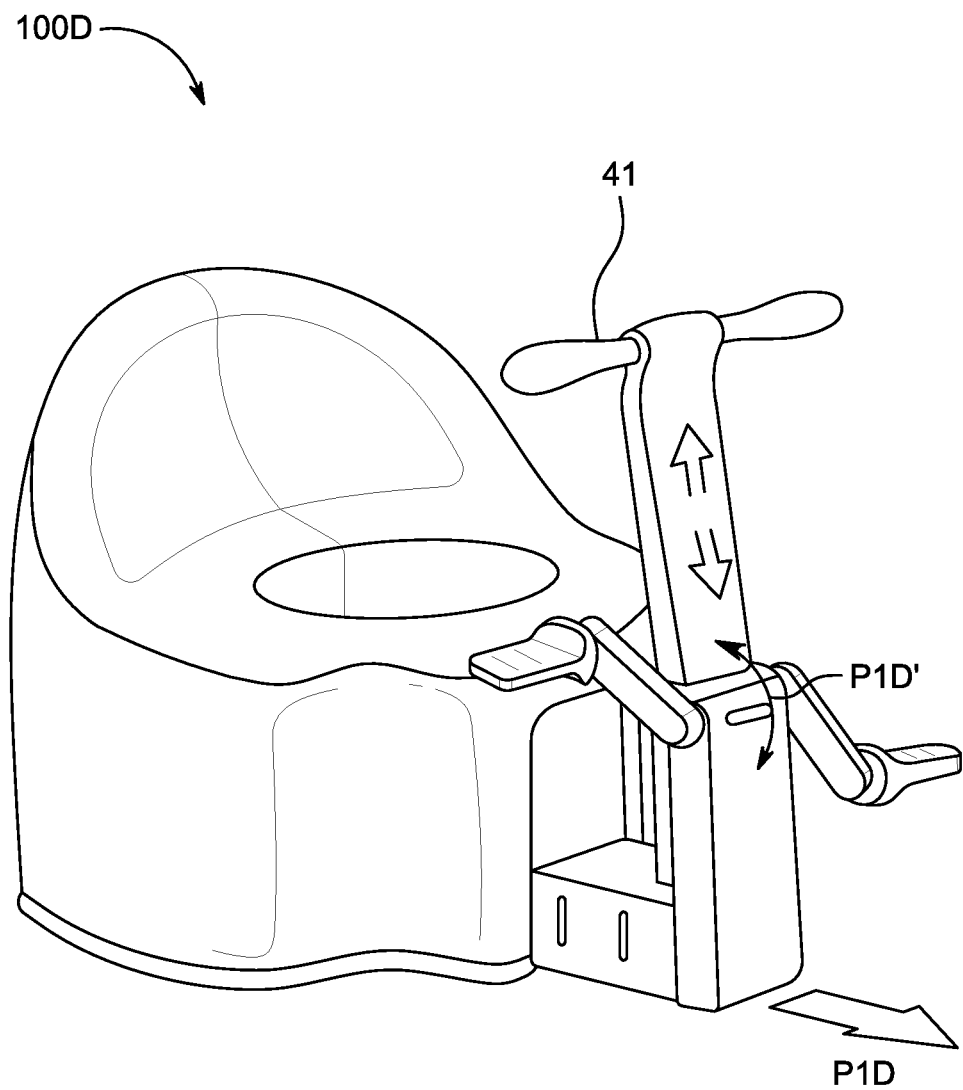
FIG. 1D is a front, top, right side perspective view of yet another DPMD assembly.
Figure 1G:
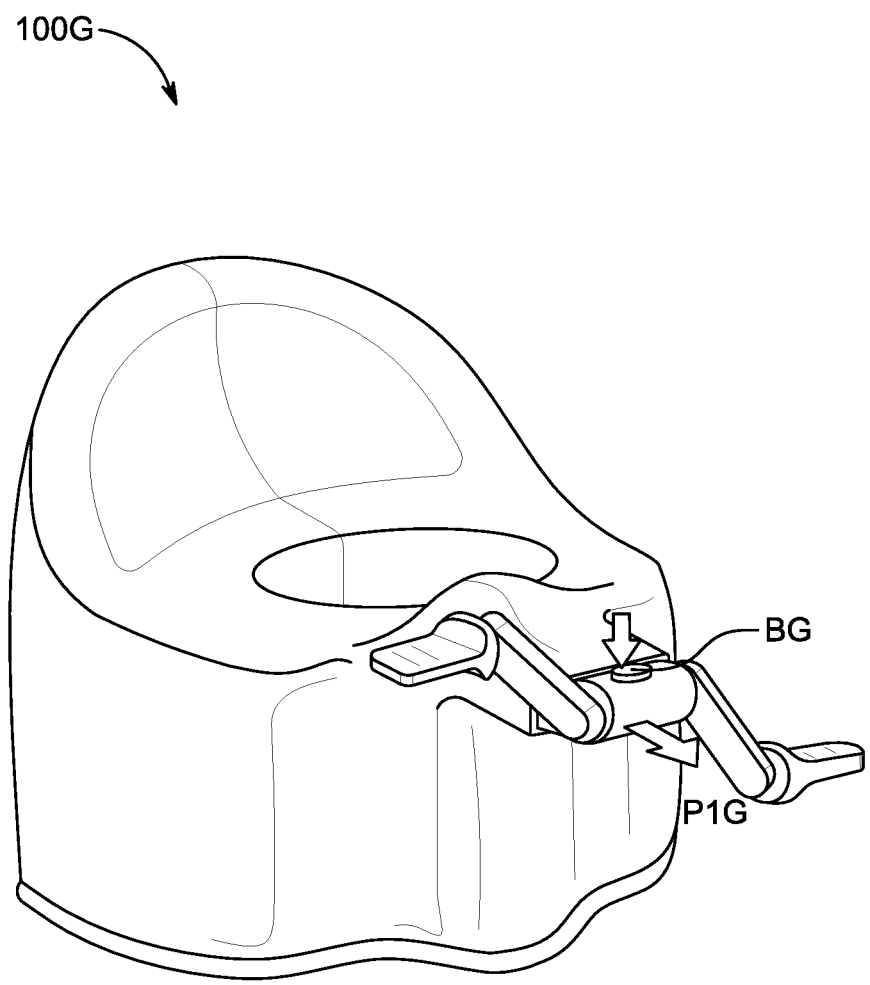
FIG. 1G is a front, top, right side perspective view of yet another DPMD assembly.
Figure 1H:
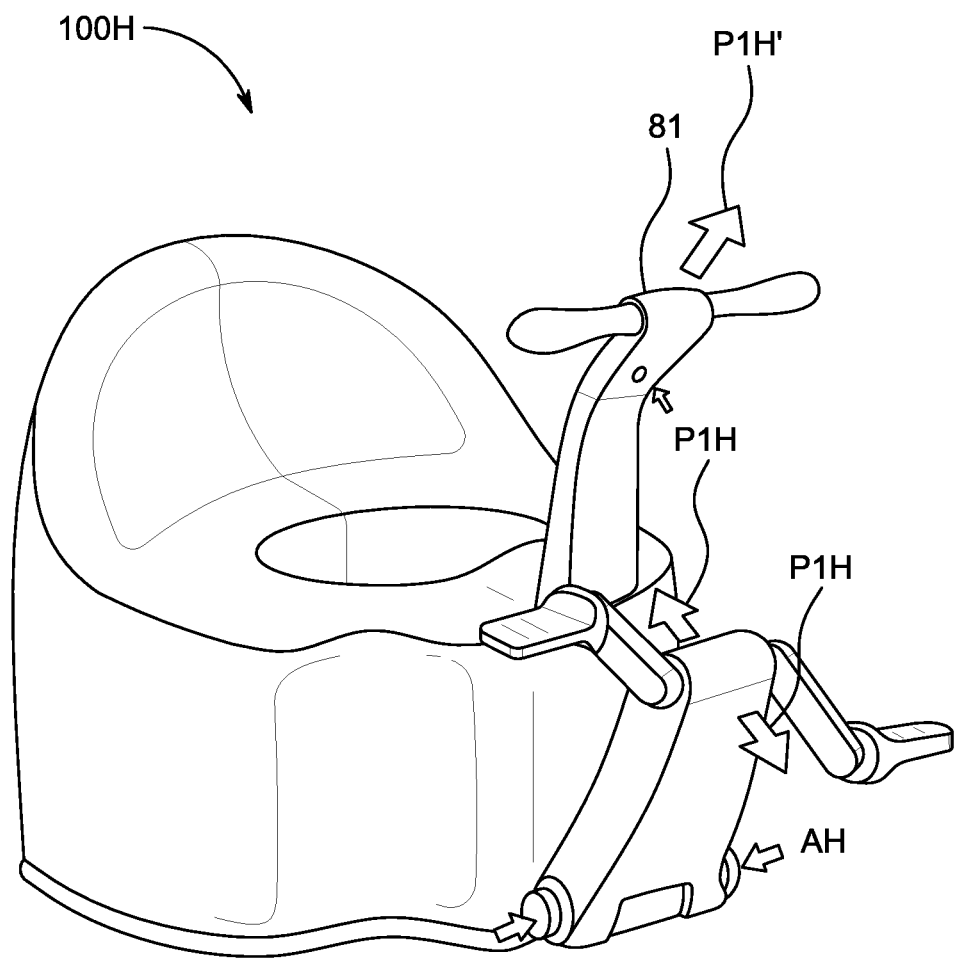
FIG. 1H is a front, top, right side perspective view of yet another DPMD assembly.
Figure 1I:
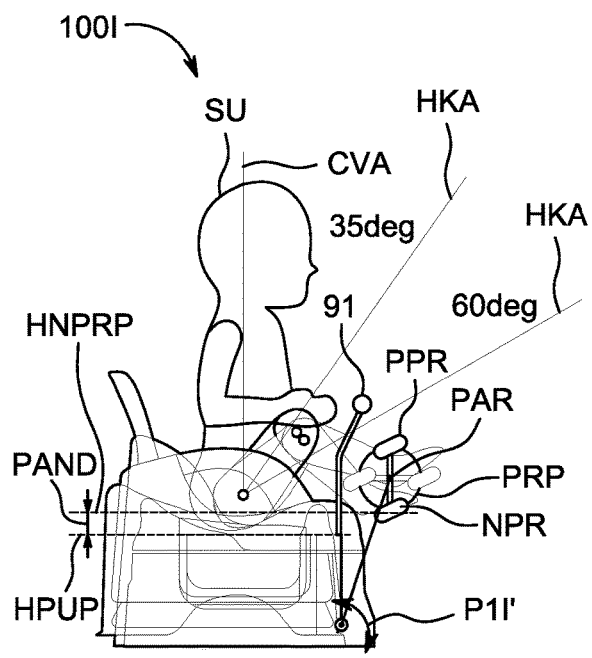
FIG. 1I is a right side elevational view of yet another DPMD assembly.
Figure 1J:
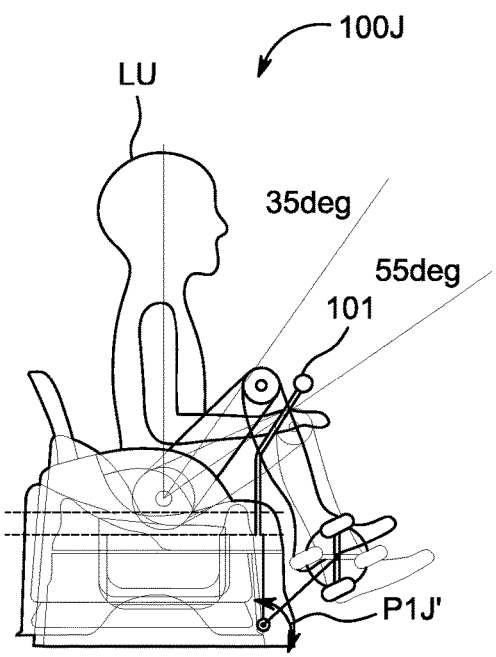
FIG. 1J is a right side elevational view of yet another DPMD assembly.
Figure 1I:
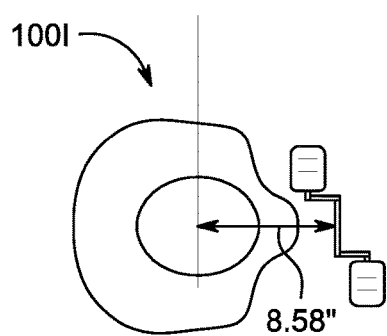
Figure 1J:
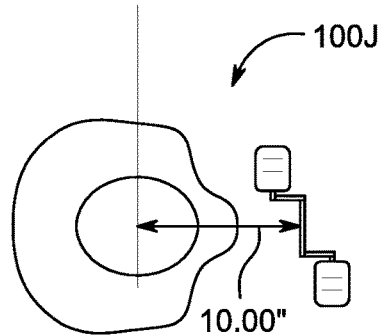

FIG. 1 is a perspective view of an original pedal potty or DPMD assembly 100. Various alternative embodiments and views of an original pedal potty assembly or simply referred to herein as an original pedal potty are provided by potty 100A of FIG. 1A, potty 100B of FIG. 1B, potty 100C of FIG. 1C, potty 100D of FIG. 1D, potty 100E of FIGS. 1E and 1E', potty 100F of FIGS. 1F and 1F', potty 100G of FIG. 1G, potty 100H of FIG. 1H, potty 100I of FIGS. 1I and 1I', and potty 100J of FIGS. 1J and 1J'. As shown by FIG. 1, potty 100 may include a potty seat portion 1 that may be made of molded plastic and/or any other suitable materials and may include a removable potty insert 2 that can be used to empty content defecated therein. There may be a structure made of rubber and/or any other suitable material(s) (e.g., any other skid-proof material(s)) that may be adhered to or otherwise coupled to or provided by the bottom of potty seat 1 to ensure that the potty remains in place with respect to the ground on which assembly 100 may be positioned during use. Potty seat portion 1 may contain a back rest 3 that can allow a child to rest comfortably and/or one or more handles 4 (e.g., recessed handles) that the child can grip for helping the child feel secure while sitting on the potty. Additionally or alternatively, one or more (e.g., bicycle-like) handlebars may be provided (e.g., arising out of and/or attached or otherwise coupled to the front and/or top and/or side(s) of the potty seat) that may be gripped by the user for extra security (see, e.g., handlebars 31 of potty 100C of FIG. 1C, handlebars 41 of potty 100D of FIG. 1D, handlebars 51 of potty 100E of FIGS. 1E and 1E', handlebars 61 of potty 100F of FIGS. 1F and 1F', handlebars 81 of potty 100H of FIG. 1H, handlebars 91 of potty 100I of FIGS. 1I and 1I', and handlebars 101 of potty 100J of FIGS. 1J and 1J'). An L-shaped or otherwise suitable shaped bracket 5, made of metal or plastic or any other suitable material, may be attached or otherwise coupled to the front and/or top and/or side(s) of the potty seat, and attached or otherwise coupled to bracket 5 may be a metal or plastic and/or any other suitable material pedal axle 6. Bracket 5 may be adjusted in length by either extending the bracket outwards or by pivoting it downwards in order to accommodate children of varying sizes (e.g., heights). Pedal axle 6 may include one or two pedals 7 (e.g., tricycle or bicycle pedal(s)) that may be rotatably coupled on one or both ends of axle 6, which may make it possible for a child to pedal while using the potty. Potty 100 may be configured such that the pedaling motion created by the child moving the pedals 7 may cause light(s) 8 (e.g., built-in LED lights) to activate and light up and/or may trigger movement of some sort in the form of turning gears (see, e.g., gears 9 of potty 100A of FIG. 1A) or other spinning objects, pop-up toys, and/or the like that may reward and/or excite the user and bring that child joy, thereby encouraging the child to use the potty and pedal(s) in the intended fashion (see, e.g., features 28 of potty 100C that may provide a light pattern or mechanical features for visual and/or tactile feedback reward to a user as the pedals are rotated). Bracket 5 may be hinged so that the top of bracket 5 coupled to pedal axle 6 can fold down towards the floor. Additionally or alternatively, as shown by potty 100A of FIG. 1A, a potty seat portion may include a slot insert 10 at the front that may allow the entire pedaling mechanism (e.g., via bracket 5) to be removed when not in use. In some embodiments, slot insert 10 may fix the orientation of bracket 5 with respect to potty seat 1 when bracket 5 is fully inserted within slot insert 10. Alternatively, slot insert 10 may allow bracket 5 to rotate within slot insert 10 (e.g., about an axis perpendicular to the ground) when bracket 5 is fully inserted within slot insert 10, which may allow pedals 7 of the pedaling mechanism to be rotated (e.g., in the direction of path P1A (e.g., to a storage position)) for enabling a user to more easily sit down and then to be rotated back (e.g., to a functional position) for use by the seated user for pedaling. Slot insert 10 may be configured to receive (e.g., via a sliding or screwing motion) and hold (e.g., via a screw or magnet or snapping mechanism or the like) any suitable portion of the pedaling mechanism (e.g., an end of bracket 5) to retain at least some orientation of the pedaling mechanism with respect to the potty during use. In another embodiment, bracket 5 may be adjustable and/or extendible from the base of the potty in various directions and/or via various adjustment mechanisms (e.g., vertically higher or lower, laterally out or in, axially or rotationally, etc.) to accommodate children of varying sizes (see, e.g., in the direction of path P1B (e.g., parallel to the ground and towards/away from the seat) of potty 100B of FIG. 1B, in the direction of path P1C of potty 100C of FIG. 1C, in the direction of path P1D of potty 100D of FIG. 1D, in the direction of path PE of potty 100E of FIGS. 1E and 1E', in the direction of path P1F of potty 100F of FIGS. 1F and 1F', in the direction of path P1G of potty 100G of FIG. 1G (e.g., while or after an adjustment button BG is utilized (e.g., depressed)), in the direction of path P1H (e.g., rotatably towards/away from) potty 100H of FIG. 1H about axis AH (e.g., an axis parallel to the pedal axis of rotation), potty 100I of FIGS. 1I and 1I', and potty 100J of FIGS. 1J and 1J'). A handlebar (see, e.g., FIGS. 1C-1F') may be clipped onto or insertable into the top of a sheath (e.g., a plastic or any other suitable material sheath) that may at least partially house the pedal axle and can pivot down (e.g., about the pedal axle axis along path P1D') towards the child to provide extra stability (see, e.g., FIG. 1D)). Alternatively, such a handlebar may extend from a main body portion of the potty (see, e.g., FIGS. 1H-1J'). Such handlebars may promote stability and/ or upright posture when used. Such handlebars may be removable from the remainder of the potty in certain embodiments (e.g., for storage or during transport).

In operation, a child may sit on the stationary potty with their feet resting on the pedals 7. The child may move the pedals by cycling their feet as though riding a tricycle. The raised position of the child's feet and knees may thereby increase the degree of the child's hip flexion allowing the child to adopt a squatting posture that would aid elimination. Moreover, the pedaling motion of the legs may stimulate the child's colon, which may further facilitate elimination without straining. When the pedals are not in use, bracket 5 coupled to pedal axle 6 may be gently pushed towards the floor thereby saving storage space. In order to bring the pedals back into proper squatting position, pedal axle 6 with pedals 7 coupled thereto may only need to be pulled back into the original raised position. In an alternative embodiment, the pedaling mechanism may simply be removed by lifting the entire pedaling mechanism out of a slot insert 10 on the front of the potty seat 1. In yet another embodiment, the pedaling mechanism can be extended at the base of the potty in order to accommodate taller children. The handlebar attachment may be adjusted using a pivoting motion that brings the handlebars closer towards the child until they lock into place (see, e.g., pivoting path P1C' of FIG. 1C). FIG. 1E may show a smaller user SU (e.g., a 20-23 month old child (e.g., child 700 of FIG. 7)) using a potty in a first configuration, while FIG. 1F may show a larger user LU (e.g., a 4 year old child (e.g., child 700A of FIG. 7A)) using the potty in a second configuration (e.g., with handlebar 51/61 raised upward and pedaling mechanism 52/62 extended outwardly (e.g., from 8.58" to 10.00" with respect to a central vertical axis of the potty, although it is to be understood that any suitable geometry may be used)). As shown, the pedaling mechanism may have a radius R defining the rotation path of the pedal(s) (e.g., pedaling rotation path PRP) about a pedal axis of rotation PAR that may be defined by pedal axle 56. Radius R may be a radius of 1.85" and a diameter of 3.7" in some embodiments, although any suitable geometry may be used. Moreover, pedals 57 may be spaced any suitable distance apart, such as 4" or 5" or any other suitable distance SD (e.g., in a range between 4" and 5" along the pedal axis of rotation PAR). As shown, in the first configuration of FIG. 1E, the pedaling mechanism 52 may be configured such that a hip-knee axis HKA may rotate between 35 degrees and 60 degrees with respect to a central vertical axis CVA of the user's body (e.g., hip flexion angles) during use of the pedaling mechanism by a user, while, in the second configuration of FIG. 1F, the pedaling mechanism 62 may be configured such that a hip-knee axis may rotate between 35 degrees and 55 degrees with respect to a central vertical axis (e.g., hip flexion angles) during use of the pedaling mechanism by a user (e.g., the angles created during the pinnacle and nadir of a pedal during its rotation about its rotation axis). Any other suitable angles or range of angles may also be useful for promoting the health benefits described herein, including an angle of about or around 22.5 degrees all the way down to anything less than 90 degrees and preferably less than 65 degrees. In some embodiments, it may be preferable for the pinnacle of the pedal rotation (e.g., PPR) to be in a horizontal pinnacle pedal rotation plane HPPRP that lies above a horizontal potty user plane HPUP (e.g., a plane parallel to the ground) that is co-planar with the top surface of the potty seat and or the anus of the user during use by any suitable distance PAPD (e.g., 0.5"-8.0" or any suitable distance, such as 3.0") to promote the health benefits described herein (e.g., as shown in FIG. 1E but may be true of any other, some, or each of the DPMDs of this disclosure). As shown, the horizontal potty user plane HPUP may include (or even be below) the horizontal plane that includes the pedal axis of rotation PAR. In some embodiments (see, e.g., FIG. 1I), even the nadir of the pedal rotation (e.g., NPR) may be in a horizontal nadir pedal rotation plane that lies above the horizontal potty user plane HPUP (e.g., in a horizontal nadir pedal rotation plane HNPRP above the HPUP by any suitable distance PAND). While FIGS. 1D-1G may show potties with pedaling mechanisms that may extend laterally away from the potty seat along an axis that may be parallel to the ground, FIGS. 1H-1J' may show potties with pedaling mechanisms that may rotate laterally away from the potty seat about an axis that may be parallel to the ground (e.g., rotation path P1H about axis AH of FIG. 1H, rotation path P1H about axis AH of FIG. 1H, rotation path P1I about axis AI of FIG. 1I, and rotation path P1J about axis AJ of FIG. 1J). While FIGS. 1D-1F' may show potties with handlebar mechanisms that may extend vertically upwards along an axis that may be perpendicular to the ground, FIGS. 1H-1J' may show potties with handlebar mechanisms that may extend away from the potty seat at some angle that may not be perpendicular to the ground (e.g., along path P1H' of FIG. 1H). In some embodiments, a handlebar mechanism may be configured to rotate about an axis during the pedaling for further simulating a tricycle/bicycle experience for the user (e.g., arm pedaling as well as leg pedaling).

A DPMD may be provided with a potty and a pedaling mechanism coupled thereto that facilitates consistent foot motion (e.g., pedaling) of a user sitting on the potty to help promote healthy bowel movements without moving the potty with respect to ground on which the potty may be positioned during use. The foot motion may raise (e.g., cyclically) the position of the user's feet and knees, thereby increasing the degree of hip flexion. Adopting a squatting posture, with the aid of this DPMD, may aid elimination. The benefits may be realized or at least increased by at least periodically raising the position of a user's foot into a horizontal plane that is above a horizontal plane including the toilet seat and/or the user's anus.

A potty reward system may be provided whereby a child may receive positive reinforcement for using a potty as a result of the fun and motivating pedaling motion that is facilitated by a DPMD (e.g., a motion similar to that of riding a tricycle). The pedaling motion may trigger lights to turn on or some other kind of motion to occur (e.g., gears spinning, pop-up toys popping, etc.), which may further positively reinforce the child's attempts at using the potty. This kind of positive reinforcement may increase the likelihood that the child would return to use the potty on subsequent occasions thereby helping children to establish a potty hygiene routine as well as reducing the stress involved in potty training for both parents and children.

A space saving solution may be provided that includes a hinged bracket that may allow pedals to fold down towards the base of a potty when the pedals are not in use. In order to return the pedals to their proper squat enhancing position, an individual may gently pull up on a hinged bracket until it locks into its original position. Alternatively, a space saving solution may include a pedaling mechanism that may be lifted out of a slotted insert in the front of the potty seat in its entirety. In yet another embodiment, a pedaling mechanism may be retracted by sliding it towards the base of the potty and an adjustable handlebar attachment may be retracted and/or removed as well.

Figure 2:
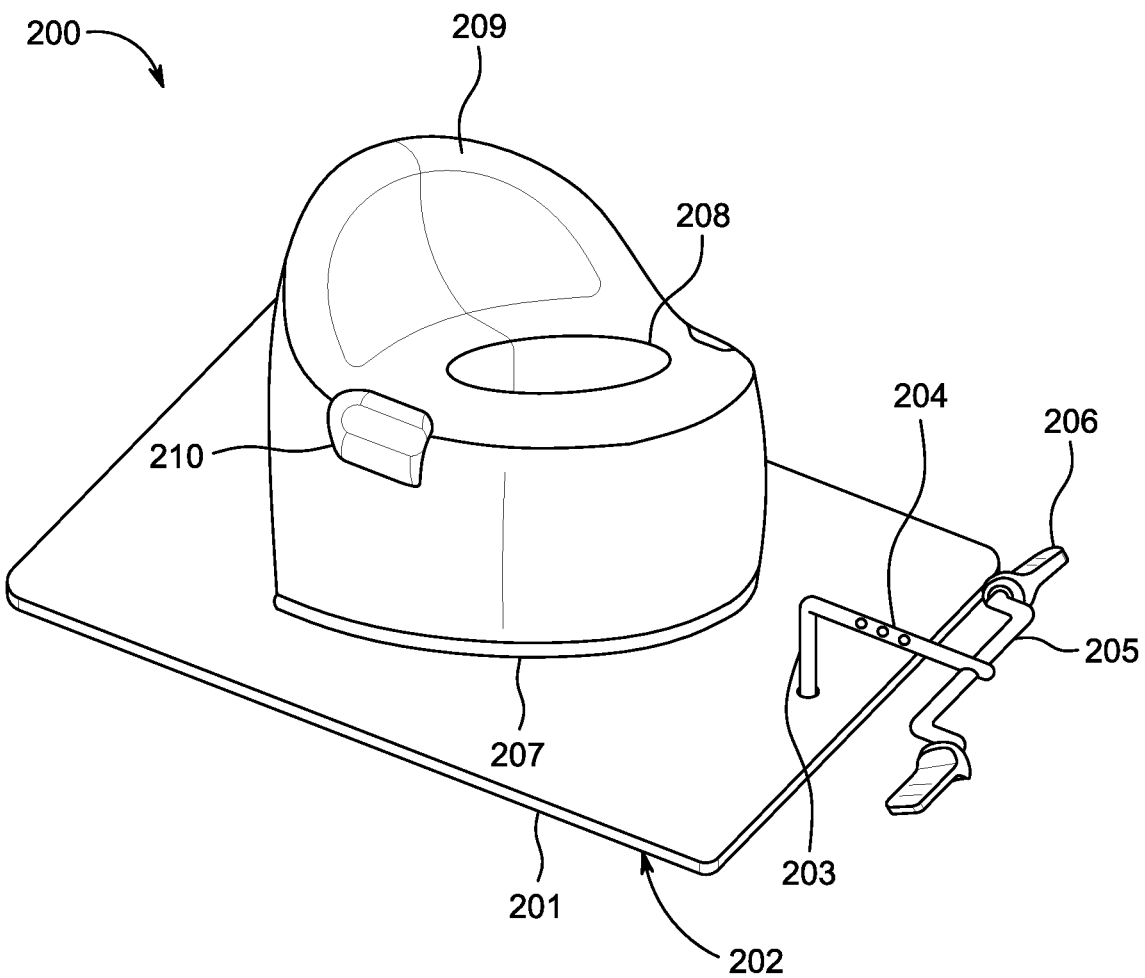
FIG. 2 is a front, top, right side perspective view of yet another DPMD assembly.
Figure 2A:
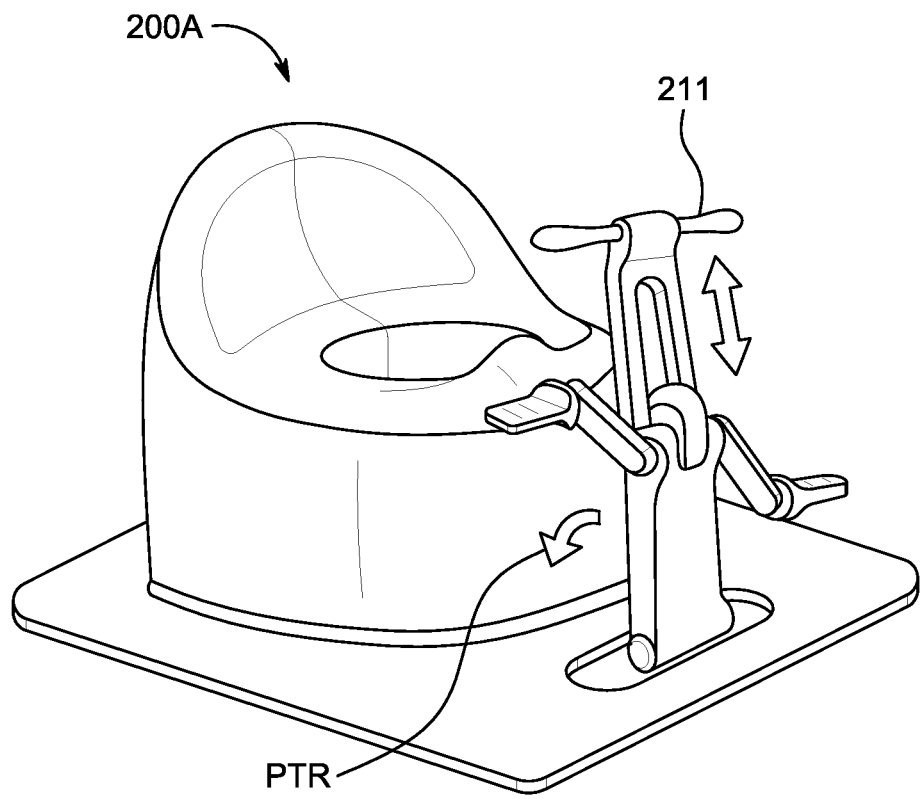
FIG. 2A is a front, top, right side perspective view of yet another DPMD assembly.
Figure 2B:
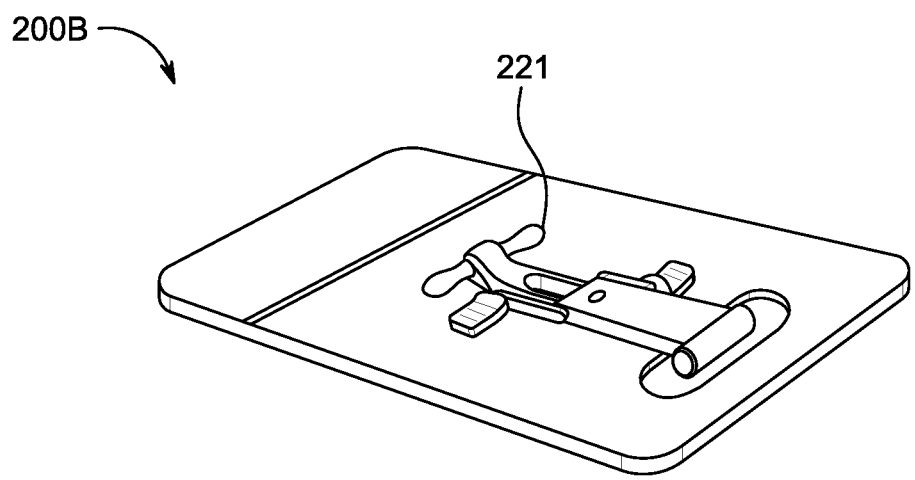
FIG. 2B is a front, top, right side perspective view of a portion of yet another DPMD assembly.
Figure 2C:
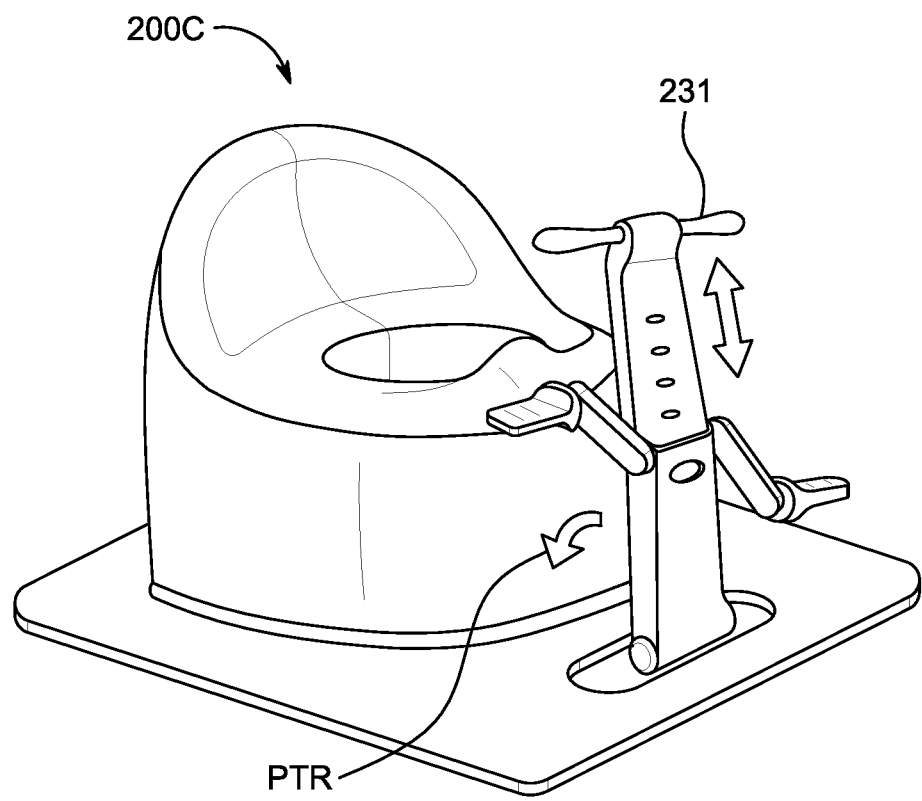
FIG. 2C is a front, top, right side perspective view of yet another DPMD assembly.
Figure 2D:
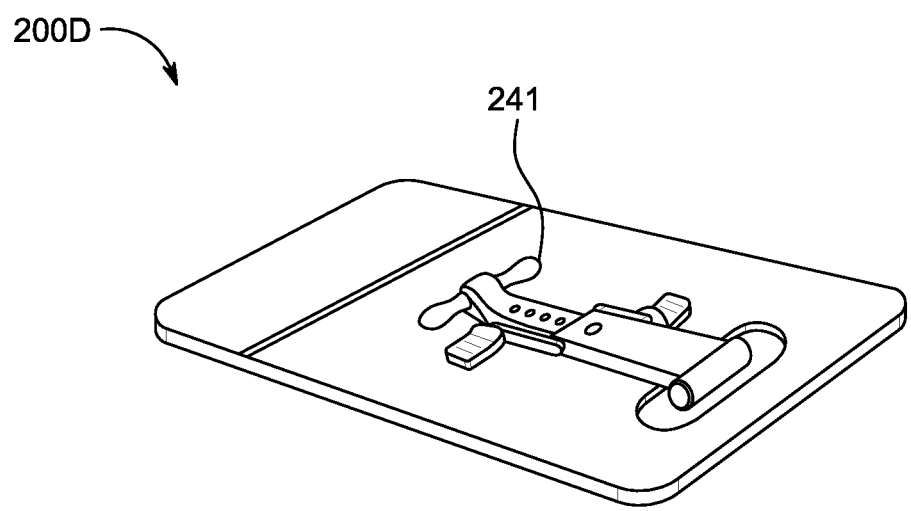
FIG. 2D is a front, top, right side perspective view of a portion of yet another DPMD assembly.

FIG. 2 is a perspective view of a pedal potty mat assembly 200 (e.g., a pedal potty mat for kids). Various alternative embodiments and views of a pedal potty mat assembly are provided by pedal potty mat assembly 200A of FIG. 2A, pedal potty mat assembly 200B of FIG. 2B, pedal potty mat assembly 200C of FIG. 2C, and pedal potty mat assembly 200D of FIG. 2D. As shown by FIG. 2, pedal potty mat assembly 200 may include a floor mat 201 with a top structure that may be made of silicone, rubber, foam, or plastic and/or any other suitable material(s) and may at least partially enclose or extend along at least a portion of a top surface of a bottom structure 202 that may be provided by one or more sheets of metal or plastic or any other suitable material(s) that may be operative to lend a supportive base to the product. There may be a rubber and/or any other suitable material(s) (e.g., any other skid-proof material(s)) that may be adhered to or otherwise coupled to or provided by the bottom of bottom structure 202 to ensure that mat 201 remains in place with respect to the ground on which mat 201 is positioned during use of assembly 200. A bracket 203 made of metal or plastic or any other suitable material(s) may be coupled to mat 201 (e.g., at its top structure or bottom structure 202 or both). Bracket 203 may include or be coupled to a rod or pole 204 that may be made of metal or plastic or any other suitable material(s) that can be adjusted to accommodate children of different heights that may use assembly 200. Integrated with and/or coupled to rod or pole 204 may be a pedal axle 205 that may be used with one or more pedals 206 that may be made of metal or plastic or any other suitable materials(s) that may be coupled to one or both ends of axle 205. Resting on top of mat 201 may be a child's potty seat 207 that may be made of molded plastic and/or any other suitable material(s) and may include a removable potty insert 208 that can be used to empty contents. Potty seat portion 207 may include a back rest 209 that may allow the child to rest comfortably. Potty seat portion 207 may also include one or more handles (e.g., recessed handles) 210 and/or handlebars that may be operative to be gripped by a child user to help ensure the child feels secure while sitting on the potty. There may be a rubber and/or any other suitable material(s) (e.g., any other skid-proof material(s)) that may be adhered to or otherwise coupled to or provided by the bottom of potty seat 207 to ensure that the potty remains in place with respect to the top of mat 201 during use of assembly 200. Additionally or alternatively, any suitable mechanism(s) (e.g., magnet(s)) may be provided by seat 207 and/or mat 201 to promote a fixed positioning of seat 207 with respect to mat 201 during use. Bracket 203, pole 204, and axle 205 may be at least partially provided within or may at least partially define a "pedal tower" or housing (e.g., a plastic or other suitable material housing that may encase at least a partition of axle 205). Inserted into such a pedal tower (e.g., through an opening at the top) or clipped onto such a pedal tower (e.g., for added security) may be a handlebar mechanism that may be adjustable in length to accommodate children of varying heights and/or that may be decoupled or removed from the pedal tower (see, e.g., handlebar mechanism 211 of assembly 200A of FIG. 2A, handlebar mechanism 221 of assembly 200B of FIG. 2B, handlebar mechanism 231 of assembly 200C of FIG. 2C, handlebar mechanism 241 of assembly 200D of FIG. 2D, etc.). A pedal tower may be rotatably coupled to the mat such that it may be folded down from a first configuration extending up away from the top of the mat during use (see, e.g., FIG. 2A and FIG. 2C) to a second configuration extending along and/or adjacent the top surface of the mat when not in use to make storage and/or transport easier (see, e.g., FIG. 2B and FIG. 2D). Alternatively or additionally, a pedal tower may be removably coupled to the mat so that they may be decoupled and stored separately when not in use.

In operation, a child may sit on the potty seat 207 with their feet resting comfortably on pedals 206. The child's body weight may help to anchor seat 207 to mat 201 and/or may help to anchor mat to the ground, which may help to ensure that assembly 200 may stay in place during use. The child may move pedals 206 by cycling their feet as though riding a tricycle. Any handlebar attachment (e.g., telescopic) may be adjusted to accommodate children of different heights by either extending or retracting. In any suitable "clip-on" handlebar embodiments, the handlebar may be easily added to or removed from the assembly (e.g., coupled to or decoupled from bracket 203 or pole 204 or axle 205) as useful attaching or releasing the attachment. As similarly described with respect to the assemblies of FIGS. 1E-1F' and 1I-1J', the raised position of the child's feet and knees during use of any of the assemblies of FIGS. 2-2D may thereby increase the degree of the child's hip flexion, which may allow the child to adopt a squatting posture that may aid elimination. Moreover, the pedaling motion of the legs may stimulate the child's colon, which may further facilitate elimination without straining. In order to save space, the pedals may simply be drawn further to the base of the potty by sliding the rear of the mat towards or away from the back of the potty. When not in use, the pedal tower itself could fold down towards the mat to conserve space. In some embodiments, the pedal tower may be rotatably lowered (e.g., along path PTR) to one or more intermediate positions between the first and second configurations of FIGS. 2A/2C and FIGS. 2B/2D (e.g., to be angled more towards certain users). Additionally or alternatively, in some embodiments, the pedal tower may be rotatably lowered to one or more positions away from the potty such that a user may more easily sit down on the seat and then rotate back up the pedal tower to a position for pedaling use. The mat may be positioned to accommodate children of varying heights by simply adjusting the position of the potty with respect to the pedals and/or handlebars in any suitable manner (e.g., using a sliding motion of the mat with respect to the potty and/or by raising or lowering the handlebars and/or pedals with respect to the mat). In some embodiments, a handlebar mechanism may be configured to rotate about an axis during the pedaling for further simulating a tricycle/bicycle experience for the user.

A DPMD may be provided with a potty and a mat with a pedaling mechanism coupled thereto that facilitates consistent foot motion (e.g., pedaling) of a user sitting on the potty when the potty is at least partially positioned on the mat to help promote healthy bowel movements without moving the potty with respect to the mat and/or without moving the mat with respect to the ground on which the mat may be positioned during use. The foot motion may raise (e.g., cyclically) the position of the user's feet and knees, thereby increasing the degree of hip flexion. Adopting a squatting posture, with the aid of this DPMD, may aid elimination.

Figure 3:
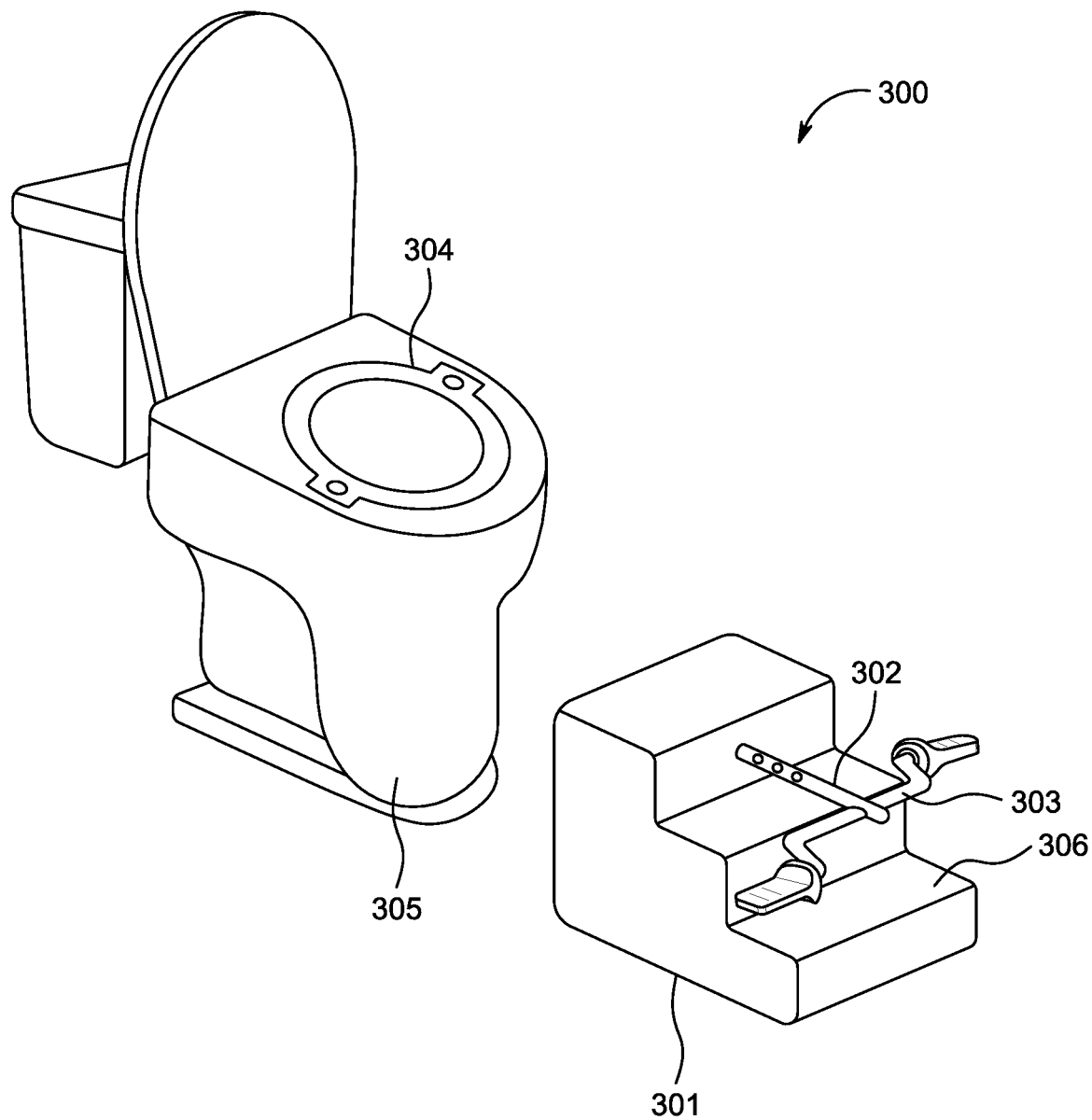
FIG. 3 is a front, top, right side perspective view of yet another DPMD assembly.

FIG. 3 is a perspective view of a pedal potty "step" assembly 300 (e.g., a pedal potty step assembly for kids). As shown by FIG. 3, if a child user were ready to "graduate" to using a regular "big kid" or "grown up" toilet 305, they may begin to use a pedal potty step assembly that may include a step structure 301 made of plastic and/or any other suitable material(s), where step structure 301 may provide any suitable number of steps 306 (e.g., 3 stairs) and may be positioned in front of the base of the toilet 305. Step structure 301 may include a slotted insert 302 (e.g., on a step surface operative to face away from the toilet during use, or any other suitable area) that may receive (e.g., via a sliding or screwing motion) and hold (e.g., via a screw or magnet or snapping mechanism or the like) any suitable pedaling mechanism 303 to retain at least some orientation of the pedaling mechanism with respect to the step structure during use. Pedaling mechanism 303 may be the same as a pedaling mechanism of an Original Pedal Potty Assembly or any other assembly described herein, such that two different assemblies may share a single pedaling mechanism that may easily be swapped between two or more different assemblies in a modular manner (e.g., as a user matures or as otherwise useful). As also shown in FIG. 3, a toilet insert seat 304 designed for children to sit comfortably on the toilet 305 may be provided that may be easily positioned on top of and removed from the seat of the toilet. There may be a structure made of rubber and/or any other suitable material(s) (e.g., any other skid-proof material(s)) that may be adhered to or otherwise coupled to or provided by the bottom of step structure 301 to ensure that step structure 301 remains in place with respect to the ground on which step structure 301 may be positioned during use, which may also ensure that step structure 301 remains in place with respect to the toilet during use as the toilet may be fixed to the ground.

In operation a child may sit comfortably on the toilet seat or on the optional toilet insert seat with their feet resting comfortably on the pedals of the pedaling mechanism and could move their legs in a cycling motion to help stimulate the colon and aid elimination. After the completion of elimination, the child may merely step down off the toilet using the stairs provided by the step structure. In some embodiments, the pedaling mechanism may be configured to be easily rotated away or otherwise moved away from the path along which a user may ascend up or descend down the stair(s) of the step structure, so that the pedals may not provide an impediment to the safe use of the assembly. For example, the slotted insert may be provided by a portion of the step structure that may rotate away from another portion of the step structure that may define the user path. Alternatively, the pedaling mechanism may include one or more features to allow a portion of the pedaling mechanism to be selectively moved out of and back into a user path along the stair(s) of the step structure (e.g., by rotating within a slotted insert of the step structure).

Figure 3C:
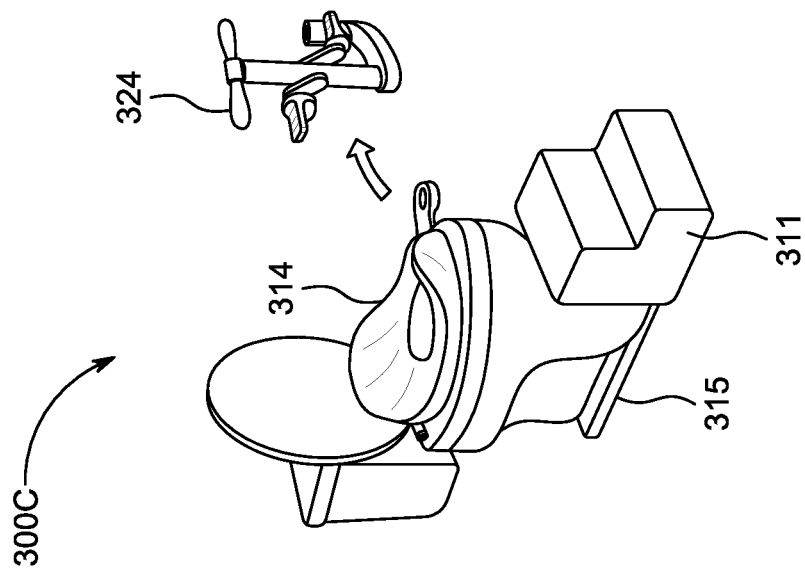
FIG. 3C is a front, top, right side perspective view of yet another DPMD assembly, similar to the DPMD assemblies of FIGS. 3A and 3B, but in yet another stage of use.
Figure 3B:
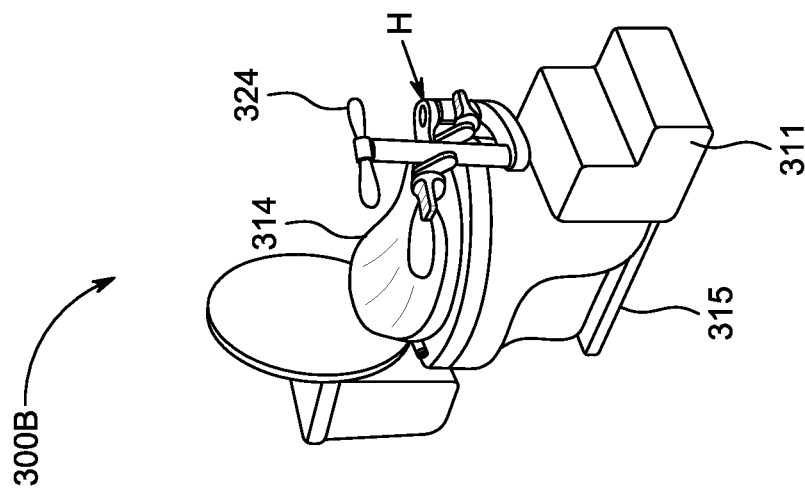
FIG. 3B is a front, top, right side perspective view of yet another DPMD assembly, similar to the DPMD assembly of FIG. 3A, but in another stage of use.
Figure 3A:
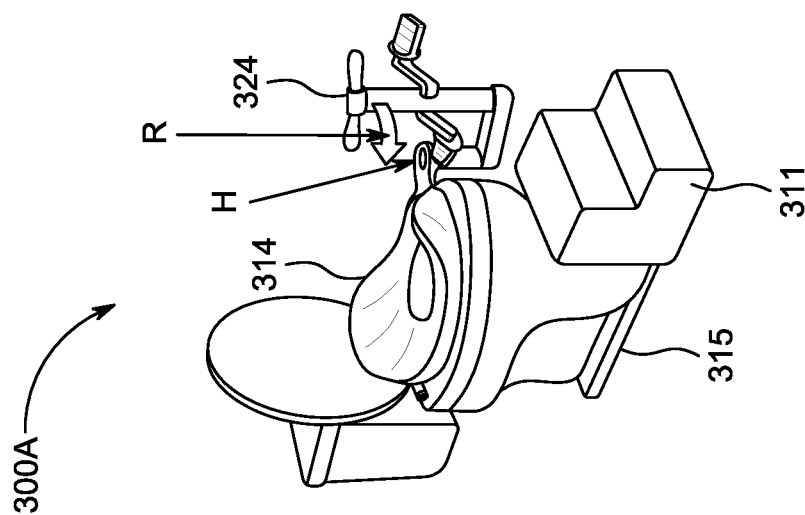
FIG. 3A is a front, top, right side perspective view of yet another DPMD assembly.

FIGS. 3A-3C show a pedal training seat assembly 300A-300C in different stages of configuration. For example, unlike pedal potty step assembly 300 of FIG. 3, and unlike assembly 300A' of FIG. 3A' and assembly 300B' of FIG. 3B' in which a pedaling mechanism 324' may be removably and/or rotatably coupled to a step structure 311' used with a toilet 315', the pedal training seat assembly of FIGS. 3A, 3B, and 3C may include a pedaling mechanism 324 that may be removably and/or rotatably coupled to a toilet insert seat 314 used with a toilet 315 rather than to a step structure 311. In some such embodiments, pedaling mechanism 324 may be rotatably or otherwise movably coupled to toilet insert training seat 314 to enable a user to selectively move the pedals of pedaling mechanism 324 into or out of a user's path up and down the stairs of a step structure 311 and/or into or out of a user's path used for enabling sitting down on or walking away from toilet 315, while a step structure may be optional in such embodiments. For example, as shown, pedaling mechanism 324 may be coupled (e.g., removably and/or rotatably or otherwise movably (e.g., slidably) coupled) to toilet seat insert 314 (e.g., via a hinge H that may easily swing into and out of a proper pedaling position using a slotted mechanism (e.g., along rotation path R (e.g., about an axis perpendicular to the pedal axis of rotation))). In operation, the child may climb up onto the toilet using a step structure while the pedaling mechanism is in the open position of FIGS. 3A and 3A' (or the removed position of FIG. 3C) and, once seated, the child or caregiver may swing (or couple) the pedaling mechanism into a pedaling position of FIGS. 3B and 3B' (e.g., using the sliding hinge mechanism or otherwise) that may be maintained (e.g., using magnet(s) or a snap or any other suitable mechanism for retaining the pedaling mechanism in the pedaling position absent some specific force or action). During use, the child may bicycle their feet using the pedals provided by the pedaling mechanism in the pedaling position while gripping handles that may be provided on the toilet seat insert or while gripping handles that may be provided by the pedaling mechanism (e.g., as shown in FIGS. 3A-3C). In some embodiments, while the pedaling mechanism is held in its pedaling position (e.g., functional position), a handlebar provided by the pedaling mechanism may be operative to rotate about an axis without rotating the pedals out from the pedaling position, such that the handlebar action may mimic conventional bicycle or tricycle handlebar use. After elimination is complete, the child or caregiver may simply swing the pedaling mechanism outwards from the pedaling position to an open position (e.g., towards the rear of the toilet seat insert) and the child may descend the toilet using the step structure. In some embodiments, rather than being removably and/or rotatably or otherwise movably coupled to a toilet seat insert, the pedaling mechanism may be removably and/or rotatably or otherwise coupled to the toilet itself, independent of any toilet seat insert that may be used (e.g., by a clamp that may be coupled to a rim of the toilet seat).

Figures 4, 4A:
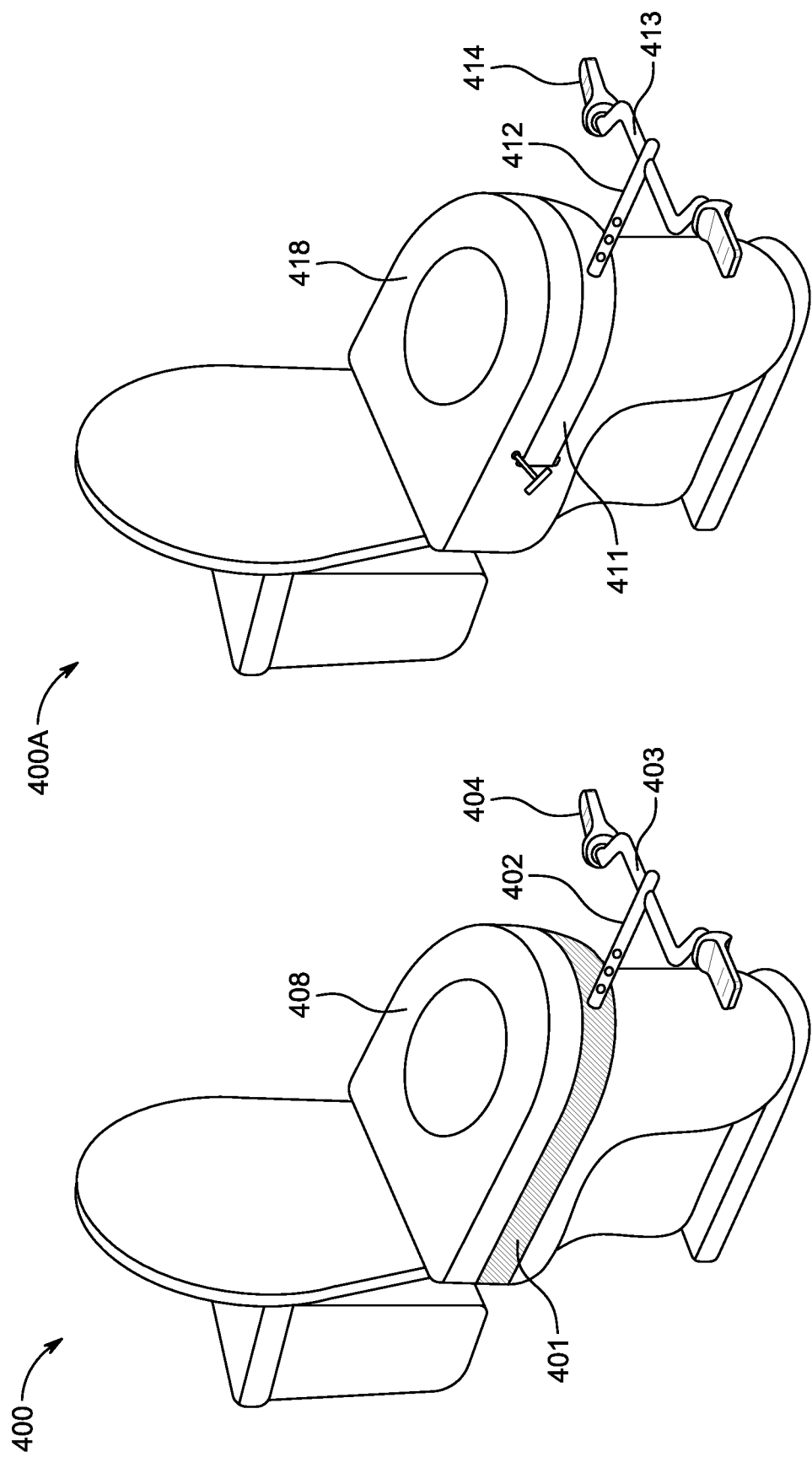
FIG. 4 is a front, top, right side perspective view of yet another DPMD assembly.
FIG. 4A is a front, top, right side perspective view of yet another DPMD assembly.

FIG. 4 is a perspective view of a pedal potty "belt" assembly 400 (e.g., a pedal potty belt assembly for adults (e.g., or mature children) or an assembly that may not include a toilet seat insert). As shown by FIG. 4, assembly 400 may include a standard adult-size toilet 408 (usable with or without a child toilet seat insert) around which an adjustable belt 401 (e.g., a belt or strap made of plastic, rubber, silicone, metal and/or any other suitable material(s)) may fit snugly (e.g., around the base of the toilet). Coupled to the front of the belt may be an adjustable bracket 402 that may be coupled to a pedal axle 403 that may include bicycle pedals 404 coupled to the ends of the axle. Bracket 402 may include a hinge at the top near the base of the toilet (e.g., at belt 401) that may allow the pedaling mechanism to fold down (e.g., towards the ground on which the toilet may be positioned) when not in use so as to save storage space and/or to enable a user to sit down on and walk away from the toilet more easily. Alternatively or additionally, the pedaling mechanism may be removably coupled to the belt by any suitable mechanism (e.g., a clip) so that the pedaling mechanism may simply be removed from the belt when not in use.

Alternatively, a pedal potty "clamp" assembly 400A (e.g., a pedal potty belt assembly for adults (e.g., or mature children) or an assembly that may not include a toilet seat insert) may be shown in perspective view by FIG. 4A, where assembly 400A may include a standard adult-size toilet 418 (usable with or without a child toilet seat insert) to which an adjustable clamp 411 (e.g., a clamp made of plastic, metal and/or any other suitable material(s)) may fit snugly (e.g., about at least a portion of the base of the toilet (e.g., as shown) or over a portion of the rim of the toilet bowl). Arising out of the front of the clamp (e.g., couplable (e.g., removably couplable) to the clamp) may be a bracket 412 (e.g., an L-shaped bracket) that may have a pedal axle 413 coupled thereto with pedals 414 at the ends thereof. Bracket 412 may include a hinge at the top near the base of the toilet (e.g., at clamp 411) that may allow the pedaling mechanism to fold down (e.g., towards the ground on which the toilet may be positioned) when not in use so as to save storage space and/or to enable a user to sit down on and walk away from the toilet more easily. Alternatively or additionally, the pedaling mechanism may be removably coupled to the clamp by any suitable mechanism (e.g., a clip) so that the pedaling mechanism may simply be removed from the clamp when not in use.

In operation, an individual may sit on the toilet seat and may extend their legs so that their feet may rest comfortably on the bicycle pedals. The individual may move the pedals by bicycling their feet as though riding a bicycle. The raised position of the individual's feet and knees may thereby increase the degree of their hip flexion, thereby allowing the individual to adopt a squatting posture that would aid elimination. Moreover, the pedaling motion of the legs may stimulate the person's colon, which may further facilitate elimination without straining. When the pedals are not in use, the bracket that may be coupled to the pedal axle of the pedaling mechanism may simply be pushed towards the floor or removed from the toilet or may simply be decoupled from the clamp or belt or may be decoupled with the clamp or belt from the toilet, thereby saving storage space. In order to bring the pedals back into proper squatting position, the pedal axle with the pedals may merely need to be pulled back into the original raised position or the pedal axle with the pedals may merely need to be recoupled to the clamp or belt as already coupled to the toilet or the pedal axle with the pedals may merely need to be recoupled with the clamp or belt to the toilet.

FIG. 5 is a perspective view of a pedal potty mat assembly 500 (e.g., a pedal potty mat assembly for adults (e.g., or mature children) or an assembly that may not include a toilet seat insert). As shown by FIG. 5, assembly 500 may include a standard adult-size toilet 508 (usable with or without a child toilet seat insert) and a mat 501 that may be similar to a mat of one or more of FIGS. 2-2D, but may, optionally, include a cut out (e.g., at an end of the mat) for extending about a portion of the periphery of the base of the toilet, such that a pedaling mechanism that may be coupled to the mat may be slid closer to the toilet and further away from the toilet. There may be a rubber and/or any other suitable material(s) (e.g., any other skid-proof material(s)) that may be adhered to or otherwise coupled to or provided by a bottom structure of the mat to ensure that mat 501 remains in place with respect to the ground on which mat 501 is positioned and on which toilet 508 is positioned (e.g., fixed) during use of assembly 500. Additionally or alternatively, any suitable mechanism(s) (e.g., magnet(s)) may be provided by mat 501 and/or the toilet to promote a fixed positioning of the toilet with respect to mat 501 during use. A bracket 502 made of metal or plastic or any other suitable material(s) may be coupled to mat 501 (e.g., at its top structure or bottom structure or both). Bracket 502 may include or be coupled to a rod or pole 503 that may be made of metal or plastic or any other suitable material(s) that can be adjusted to accommodate users of different heights that may use assembly 500. Integrated with and/or coupled to rod or pole 503 may be a pedal axle 504 that may be used with one or more pedals 505 that may be made of metal or plastic or any other suitable materials(s) that may be coupled to one or both ends of axle 504. Bracket 502, pole 503, and axle 504 may be at least partially provided within or may at least partially define a "pedal tower" or housing (e.g., a plastic or other suitable material housing that may encase at least a partition of axle 504). The pedal tower may be rotatably coupled to the mat such that it may be folded down from a first configuration extending up away from the top of the mat during use to a second configuration extending along and/or adjacent the top surface of the mat when not in use to make storage and/or transport easier. Alternatively or additionally, a pedal tower may be removably coupled to the mat so that they may be decoupled and stored separately when not in use.

In operation, an individual may sit on the toilet seat (or on an optional toilet seat insert) and may extend their legs so that their feet may rest comfortably on the bicycle pedals. The individual may pedal their feet as though riding a bicycle. The raised position of the individual's feet and knees may thereby increase the degree of their hip flexion thus allowing the individual to adopt a squatting posture that may aid elimination. Moreover, the pedaling motion of the legs may stimulate the person's colon, which may further facilitate elimination without straining. The mat 1 may be positioned to accommodate individuals of varying heights by simply adjusting the position of the mat with respect to the toilet using a sliding motion and/or the height of the pedals with respect to the mat using any suitable adjustment mechanism(s).

FIG. 5A is a perspective view of a stair stepper assembly 500A (e.g., a stair stepper assembly for adults (e.g., or mature children) or an assembly that may not include a toilet seat insert). As shown by FIG. 5A, assembly 500A may include a standard adult-size toilet 518 (usable with or without a child toilet seat insert) and a mat 511 that may be similar to a mat of one or more of FIGS. 2-2D, but may, optionally, like mat 501 of FIG. 5, include a cut out (e.g., at an end of the mat) for extending about a portion of the periphery of the base of the toilet, such that a stepping mechanism that may be coupled to the mat may be slid closer to the toilet and further away from the toilet. There may be a rubber and/or any other suitable material(s) (e.g., any other skid-proof material(s)) that may be adhered to or otherwise coupled to or provided by a bottom structure of the mat to ensure that the mat remains in place with respect to the ground on which the mat is positioned and on which the toilet is positioned (e.g., fixed) during use of assembly 500A. Additionally or alternatively, any suitable mechanism(s) (e.g., magnet(s)) may be provided by the mat and/or the toilet to promote a fixed positioning of the toilet with respect to the mat during use. A stepping mechanism 512 with one or more pedals 514 may be provided and may be attached to one or more spring tension levers 516 that may provide some (e.g., mild or adjustable) resistance when in use by a user (e.g., when a user is sitting on the toilet while also alternately stepping down with one of their two feet on one of the two pedals). The spring tension levers may be coupled to a base 517 made of plastic and/or metal and/or any other suitable material that may be coupled (e.g., removably or fixedly and/or rotatably or otherwise movably (e.g., at a bottom end of the base)) to the mat.

In operation, the individual using assembly 500A may move their feet up and down in a stepping motion as though they were using a stair stepper exercise machine. Like bicycle pedaling, the accompanying motion of the user using the stair stepper may stimulate the colon and help to facilitate elimination. It is to be understood that such a stepping mechanism of assembly 500A may be used as an alternative to any of the pedaling mechanisms of FIGS. 1-5.

While there have been described defecation postural modification devices and methods of using the same, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the previous description of the disclosed examples can be practiced by other than the described embodiments, which are presented for purposes of illustration rather than of limitation.

What is claimed is:

1. A defecation postural modification device ("DPMD") assembly for use with a toilet seat operative to support a user seated thereon, the DPMD assembly comprising:
   a pedaling mechanism comprising:
      a pedal axle defining a pedal axis of rotation; and
      a pedal coupled to an end of the pedal axle and operative to be rotated along a pedaling rotation path that extends about the pedal axis of rotation; and
   a toilet coupling mechanism coupled to the pedaling mechanism and operative to hold the pedaling mechanism in a functional position with respect to the toilet seat, wherein the pinnacle of the pedaling rotation path is higher off the ground than the toilet seat when the pedaling mechanism is held in the functional position with respect to the toilet seat.

2. The DPMD assembly of claim 1, wherein the nadir of the pedaling rotation path is higher off the ground than the toilet seat when the pedaling mechanism is held in the functional position with respect to the toilet seat.

3. The DPMD assembly of claim 1, wherein a portion of the pedaling rotation path is higher off the ground than the toilet seat when the pedaling mechanism is held in the functional position with respect to the toilet seat.

4. The DPMD assembly of claim 1, wherein the pedaling mechanism further comprises another pedal coupled to another end of the pedal axle and operative to be rotated along another pedaling rotation path that extends about the pedal axis of rotation.

5. The DPMD assembly of claim 1, wherein rotation of the pedal along the pedaling rotation path does not move the toilet seat along the ground.

6. The DPMD assembly of claim 1, wherein rotation of the pedal along the pedaling rotation path by a foot of the user seated on the toilet seat rotates a hip-knee axis of the user with respect to a central vertical axis of the user in a range of angles that exists between an angle of 23 degrees and 65 degrees.

7. The DPMD assembly of claim 1, wherein rotation of the pedal along the pedaling rotation path by a foot of the user seated on the toilet seat rotates a hip-knee axis of the user with respect to a central vertical axis of the user in a range of angles that exists between an angle of 35 degrees and 60 degrees.

8. The DPMD assembly of claim 1, wherein the toilet coupling mechanism is further operative to move the pedaling mechanism from the functional position to a storage position through translation of the pedal axle along a storage axis extending away from the toilet seat.

9. The DPMD assembly of claim 1, wherein the toilet coupling mechanism is further operative to move the pedaling mechanism from the functional position to a storage position through rotation of the pedal axle along a storage rotation path that extends about a storage axis that is parallel to the pedal axis of rotation.

10. The DPMD assembly of claim 1, wherein the toilet coupling mechanism is further operative to move the pedaling mechanism from the functional position to a storage position through rotation of the pedal axle along a storage rotation path that extends about a storage axis that is perpendicular to the pedal axis of rotation.

11. The DPMD assembly of claim 1, wherein the toilet coupling mechanism comprises a bracket that is operative to be coupled to a toilet comprising the toilet seat.

12. The DPMD assembly of claim 1, wherein the toilet coupling mechanism comprises a belt that is operative to be coupled to a toilet comprising the toilet seat.

13. The DPMD assembly of claim 1, wherein the toilet coupling mechanism comprises a clamp that is operative to be coupled to a toilet comprising the toilet seat.

14. The DPMD assembly of claim 1, further comprising a mat coupled to the toilet coupling mechanism.

15. The DPMD assembly of claim 14, wherein the mat is operative to support a toilet comprising the toilet seat.

16. The DPMD assembly of claim 14, wherein the mat is operative to be moved along the ground with respect to the toilet seat.

17. The DPMD assembly of claim 1, further comprising a step structure coupled to the toilet coupling mechanism.

18. A defecation postural modification device ("DPMD") assembly for use with a toilet seat operative to support a user seated thereon, the DPMD assembly comprising:
   a foot mechanism comprising:
      a foot axle defining a foot axis of rotation; and
      a pedal coupled to an end of the foot axle and operative to be rotated along at least a portion of a foot rotation path that extends about the foot axis of rotation; and
   a toilet coupling mechanism coupled to the pedaling mechanism and operative to hold the foot mechanism in a functional position with respect to the toilet seat, wherein at least a portion of the at least a portion of the foot rotation path is higher off the ground than the anus of the user seated on the toilet seat when the foot mechanism is held in the functional position with respect to the toilet seat.

19. The DPMD assembly of claim 18, wherein the foot mechanism comprises a spring tension lever that resists at least partial rotation of the pedal along the at least a portion of the foot rotation path.

20. A defecation postural modification device ("DPMD") assembly comprising:
   a toilet comprising a toilet seat;
   a pedaling mechanism comprising:
      a pedal axle defining a pedal axis of rotation; and
      a pedal coupled to an end of the pedal axle and operative to be rotated along a pedaling rotation path about the pedal axis of rotation; and
   a toilet coupling mechanism coupled to the toilet and coupled to the pedaling mechanism, wherein:
      the toilet coupling mechanism is operative to hold the pedaling mechanism in a functional position with respect to the toilet seat; and
      rotation of the pedal along the pedaling rotation path does not move the toilet along the ground when the pedaling mechanism is held in the functional position with respect to the toilet seat.

* * * * *